United States Patent
Boregowda et al.

(10) Patent No.: US 10,252,346 B2
(45) Date of Patent: Apr. 9, 2019

(54) REDUCER SLEEVE WITH THRU COOLANT FLOW AND A CUTTING ASSEMBLY USING SUCH REDUCER SLEEVE

(71) Applicant: Kennametal Inc., Latrobe, PA (US)

(72) Inventors: Santhosha B Boregowda, Maddur (IN); Josef K Herud, Herzogenaurach (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/256,803

(22) Filed: Sep. 6, 2016

(65) Prior Publication Data

US 2016/0368064 A1 Dec. 22, 2016

Related U.S. Application Data

(63) Continuation of application No. 14/669,298, filed on Mar. 26, 2015.

(30) Foreign Application Priority Data

Apr. 4, 2014 (IN) .......................... 1800/CHE/2014

(51) Int. Cl.
*B23B 31/20* (2006.01)
*B23B 31/10* (2006.01)
(Continued)

(52) U.S. Cl.
CPC .......... *B23B 31/102* (2013.01); *B23B 31/305* (2013.01); *B23B 51/12* (2013.01);
(Continued)

(58) Field of Classification Search
CPC ..... B23B 31/102; B23B 31/305; B23B 51/12; B23B 2260/026; B23B 2250/12;
(Continued)

(56) References Cited

U.S. PATENT DOCUMENTS 4,213,354 A * 7/1980 Dahinden ............ B23Q 11/005
407/11
4,705,439 A 11/1987 Hoyle
(Continued)

FOREIGN PATENT DOCUMENTS

DE 202011004231 U1 * 8/2011 .......... B23B 31/201
DE 202012104969 2/2013
(Continued)

OTHER PUBLICATIONS

Swiss Precision Tools HS Hydraulic Reduction Sleeves.
(Continued)

*Primary Examiner* — Daniel Howell
*Assistant Examiner* — Paul M Janeski
(74) *Attorney, Agent, or Firm* — Matthew S. Bedsole

(57) ABSTRACT

Reducer sleeves are described herein. Reducer sleeves described herein comprise a reducer sleeve body having an axial forward end and an axial rearward end. The reducer sleeve body defines a longitudinal axis. Reducer sleeves further comprise a flange disposed at the axial forward end of the reducer sleeve body. The flange defines a first nozzle disposed at a first radial distance from the longitudinal axis and a second nozzle disposed at a second distance from the longitudinal axis. The reducer sleeve body defines a first trough extending from the axial rearward end to the axial forward end. The first trough is in communication with the first nozzle and the second nozzle, whereby coolant is able to enter the first trough and flow along the first trough and into the first nozzle and the second nozzle such that the coolant is ejected by the first nozzle and the second nozzle.

20 Claims, 28 Drawing Sheets

(51) Int. Cl.
*B23B 51/12* (2006.01)
*B23B 31/30* (2006.01)
*B23Q 11/10* (2006.01)

(52) U.S. Cl.
CPC ...... *B23Q 11/1023* (2013.01); *B23B 2231/04* (2013.01); *B23B 2231/24* (2013.01); *B23B 2250/12* (2013.01); *B23B 2260/026* (2013.01); *Y10T 279/17111* (2015.01)

(58) Field of Classification Search
CPC ............ B23B 2231/04; B23B 2231/24; B23Q 11/1023; Y10T 279/17111
See application file for complete search history.

(56) References Cited

U.S. PATENT DOCUMENTS

| | | | |
|---|---|---|---|
| 5,358,360 A * | 10/1994 | Mai | B23Q 11/1084 279/20 |
| 5,947,657 A | 9/1999 | Lipohar | |
| 6,135,679 A | 10/2000 | Kazda | |
| 7,785,046 B2 * | 8/2010 | Beckington | B23B 31/02 279/20 |
| 8,337,125 B2 * | 12/2012 | Digernes | B23B 27/10 279/20 |
| 2004/0013480 A1 * | 1/2004 | Beckington | B23Q 1/0036 408/61 |
| 2007/0077132 A1 * | 4/2007 | Beckington | B23B 31/02 408/61 |
| 2007/0252344 A1 | 11/2007 | Retzbach | |

FOREIGN PATENT DOCUMENTS

| | | | | |
|---|---|---|---|---|
| DE | 102012101672 A1 * | 8/2013 | ......... | B23B 31/1179 |
| JP | 05329705 | 12/1993 | | |
| JP | 2014231140 A * | 12/2014 | .......... | B23B 31/204 |
| WO | WO2010062850 A1 | 6/2010 | | |

OTHER PUBLICATIONS

Mar. 22, 2017 Office action (3 months).
Oct. 6, 2017 Final Office Action.
Mar. 9, 2018 Office action (3 months).

* cited by examiner

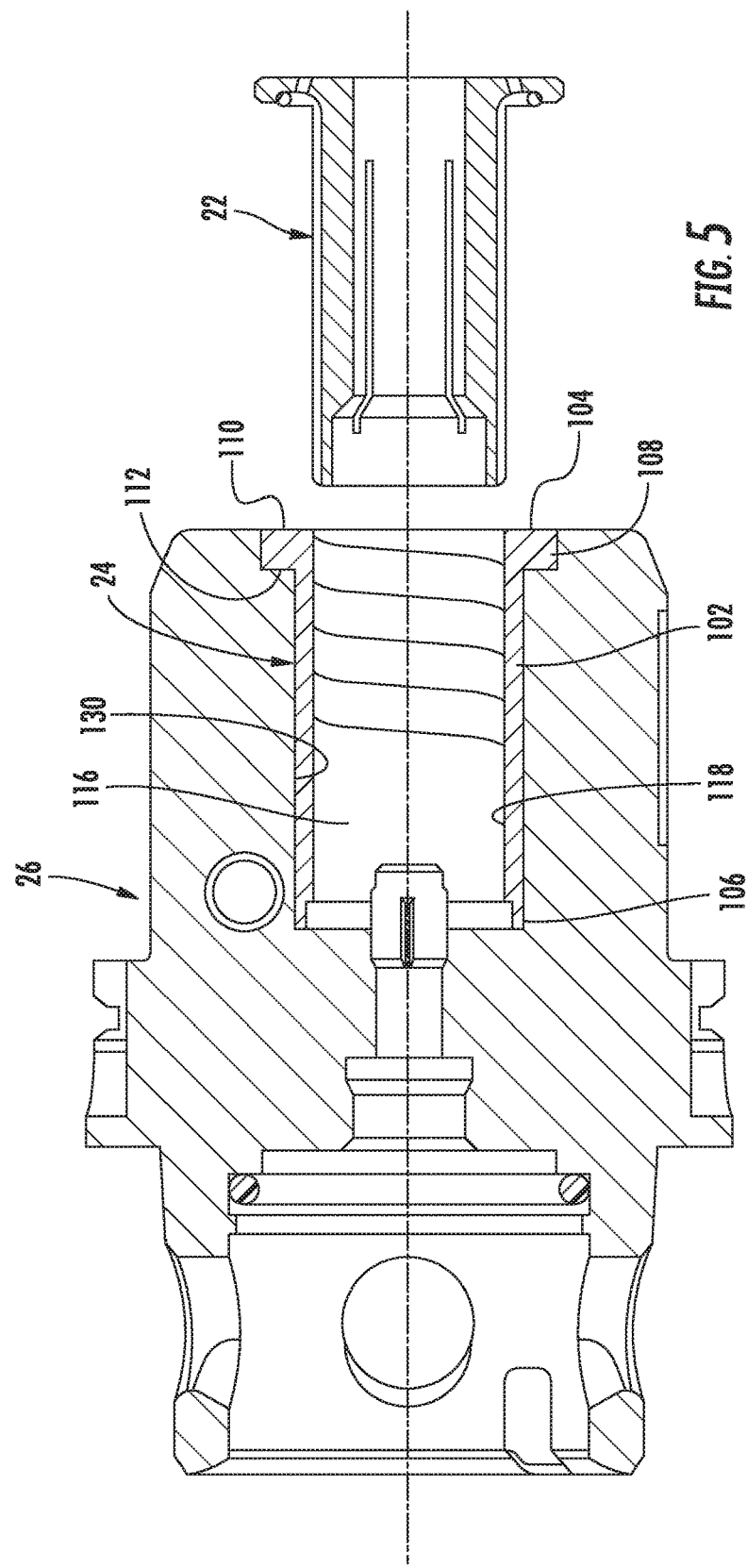

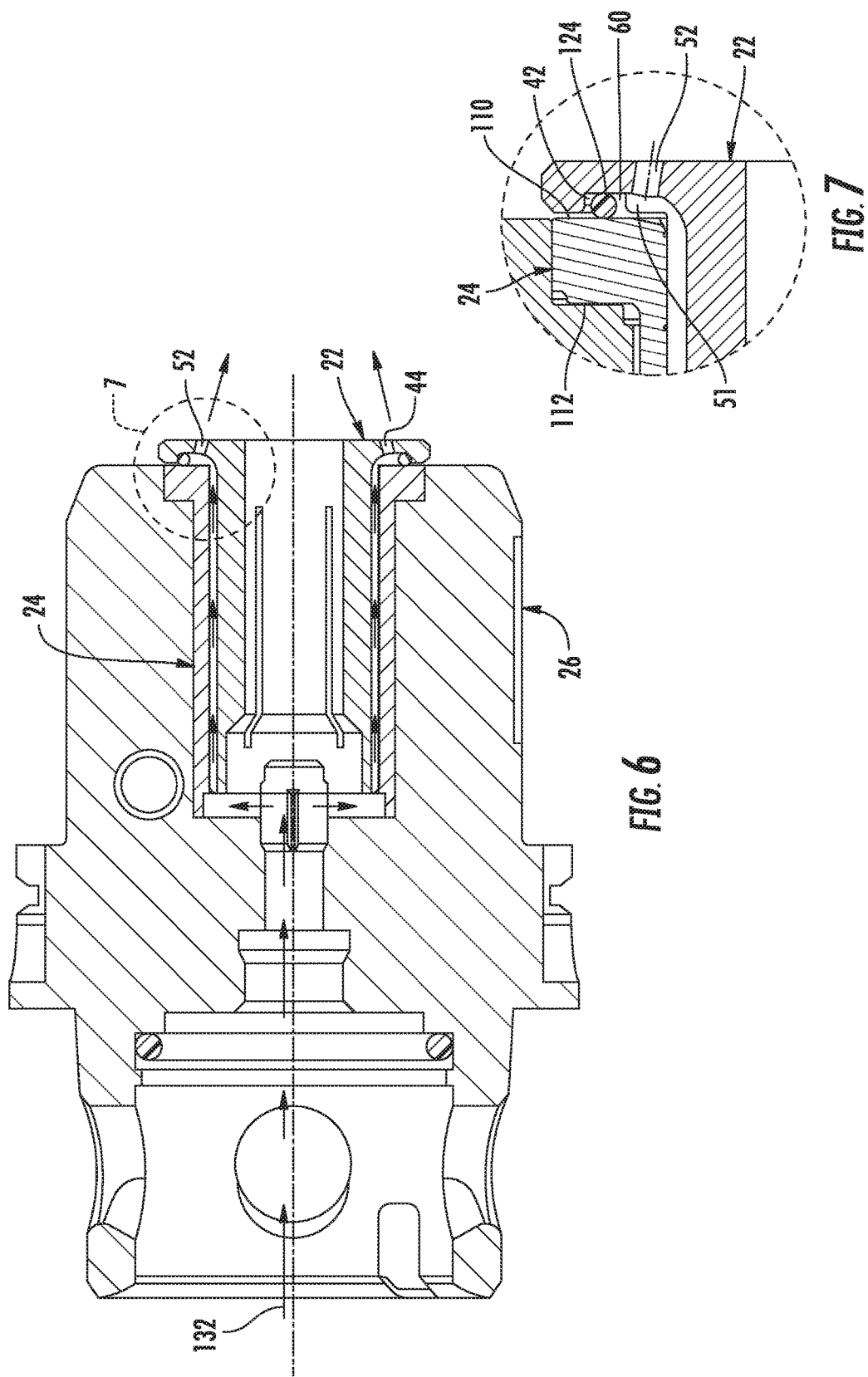

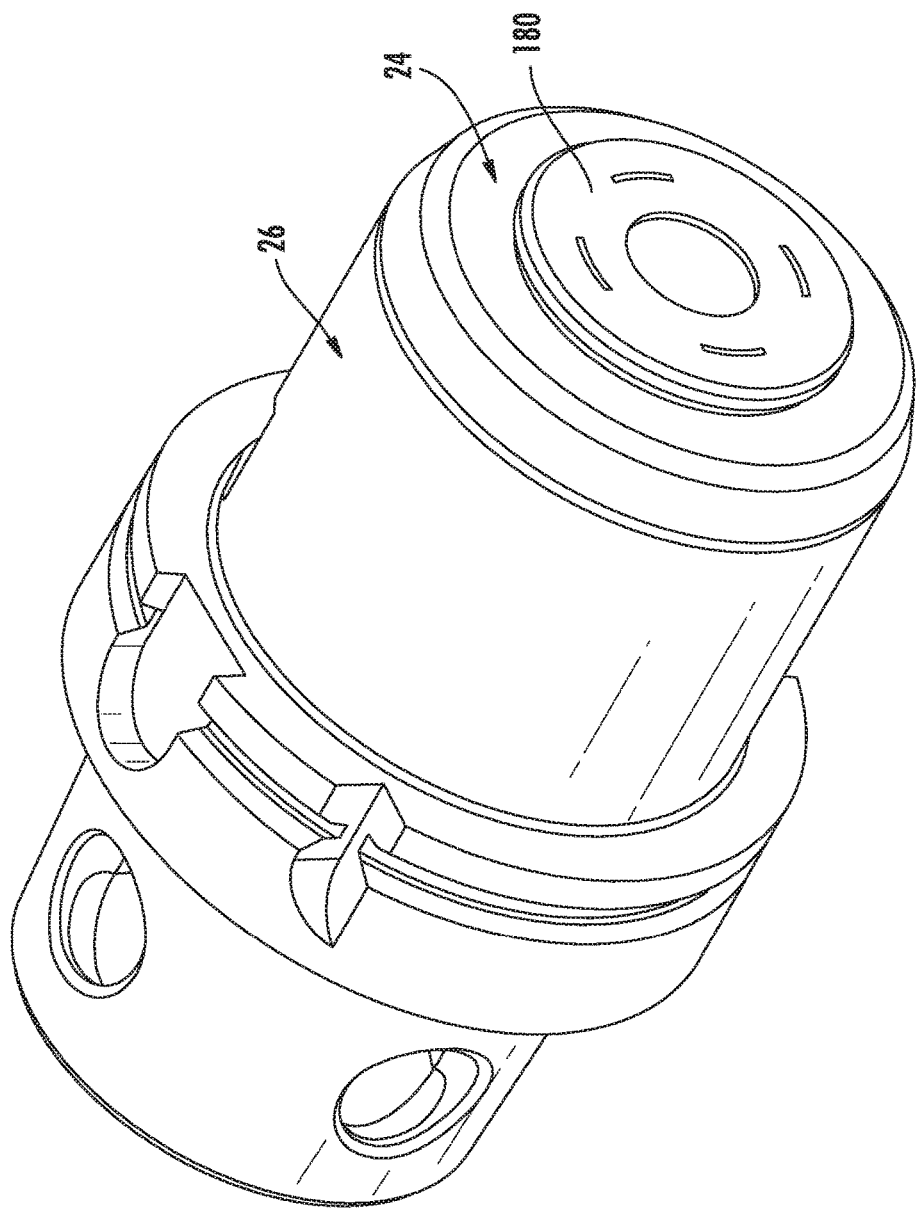

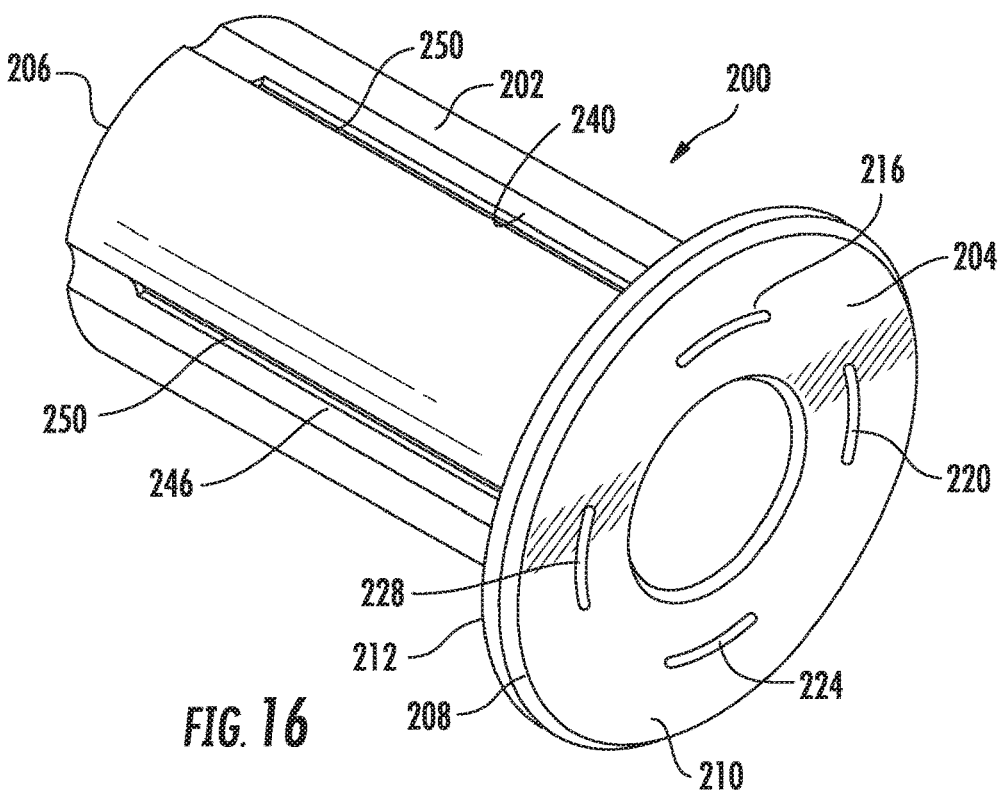
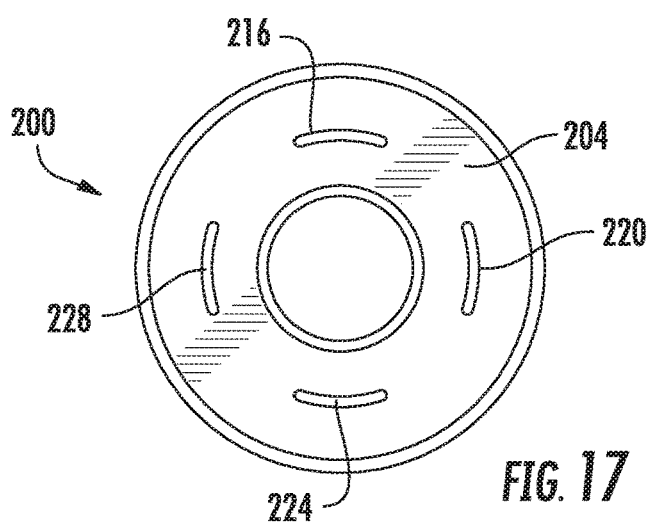

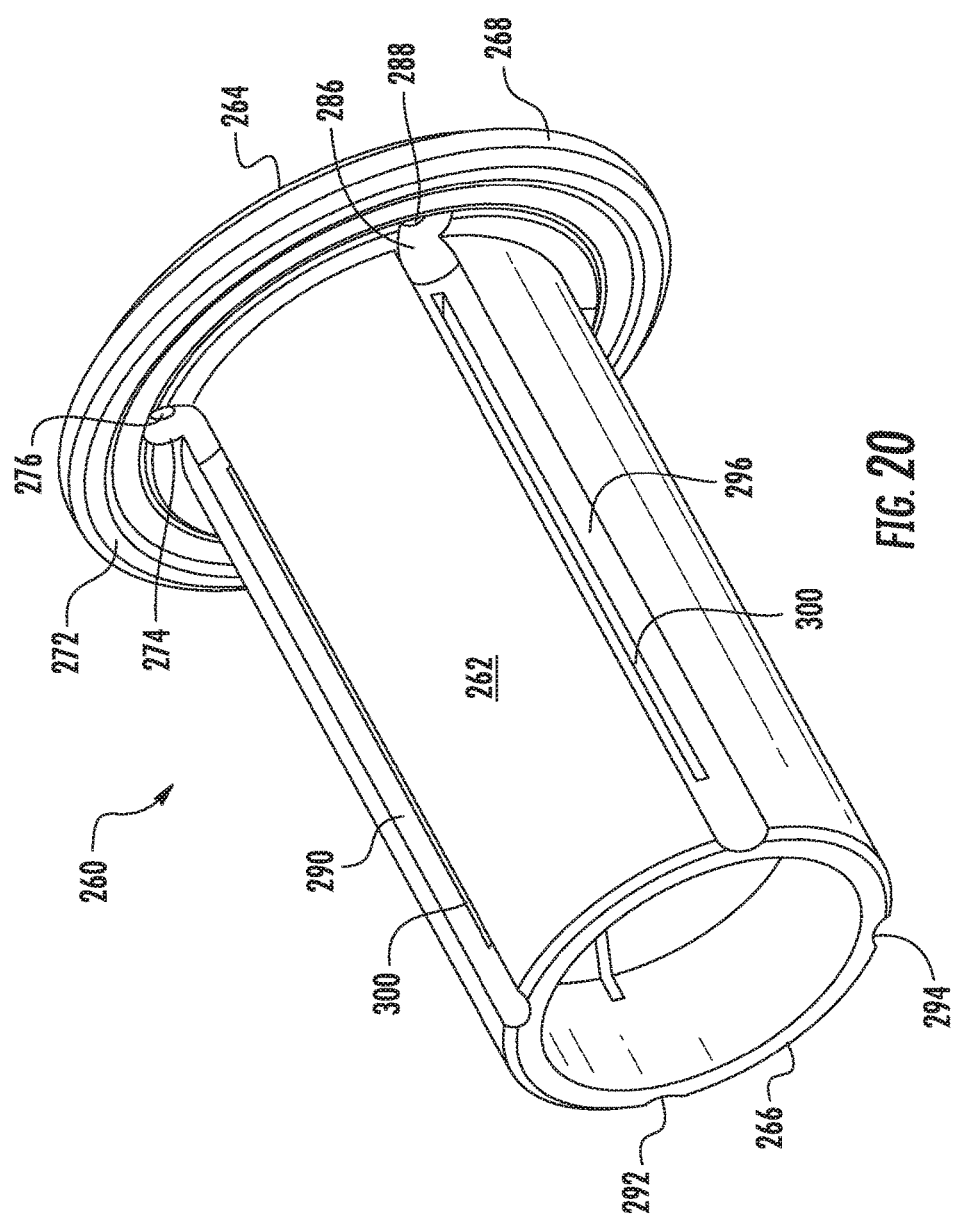

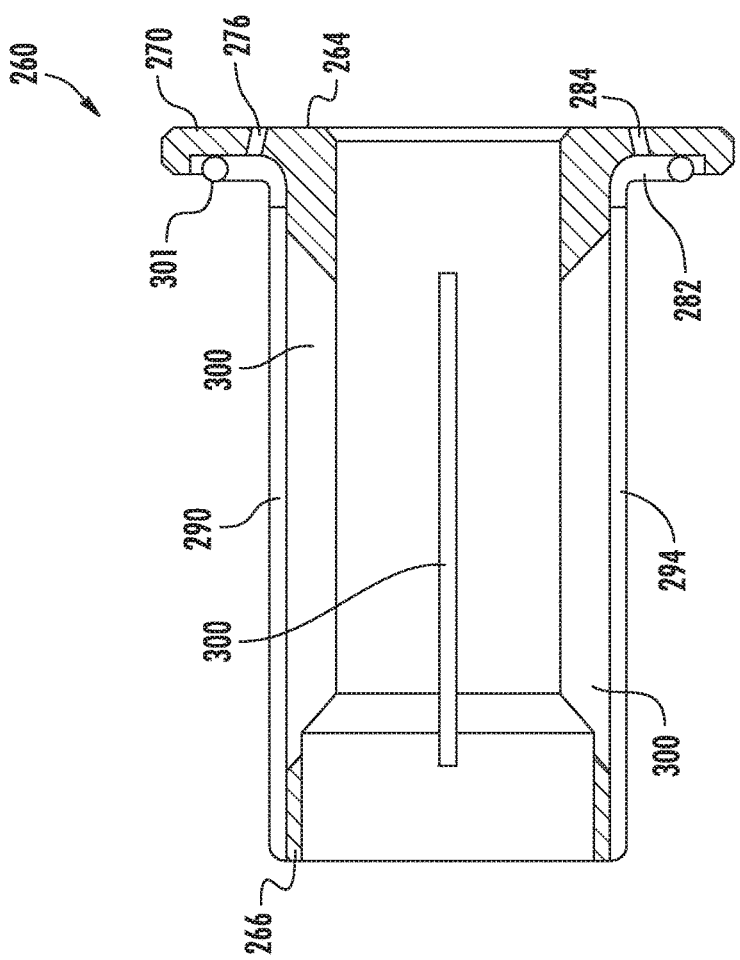
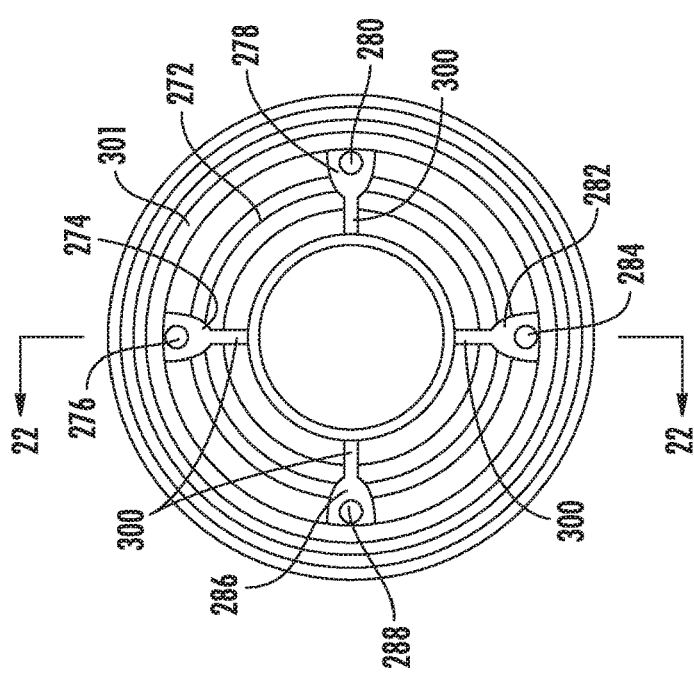
FIG. 22
FIG. 21

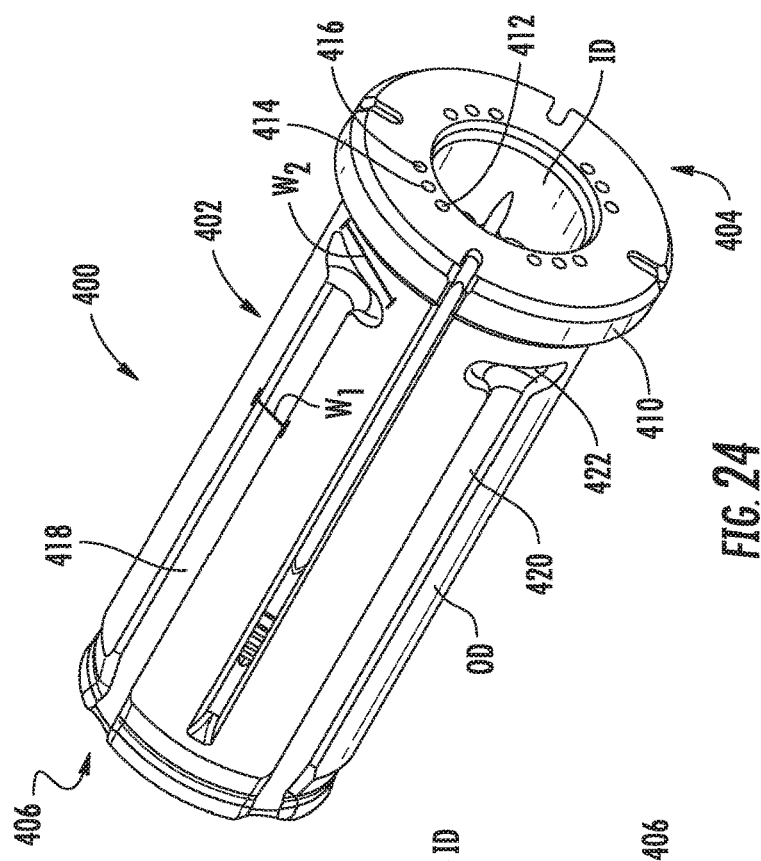
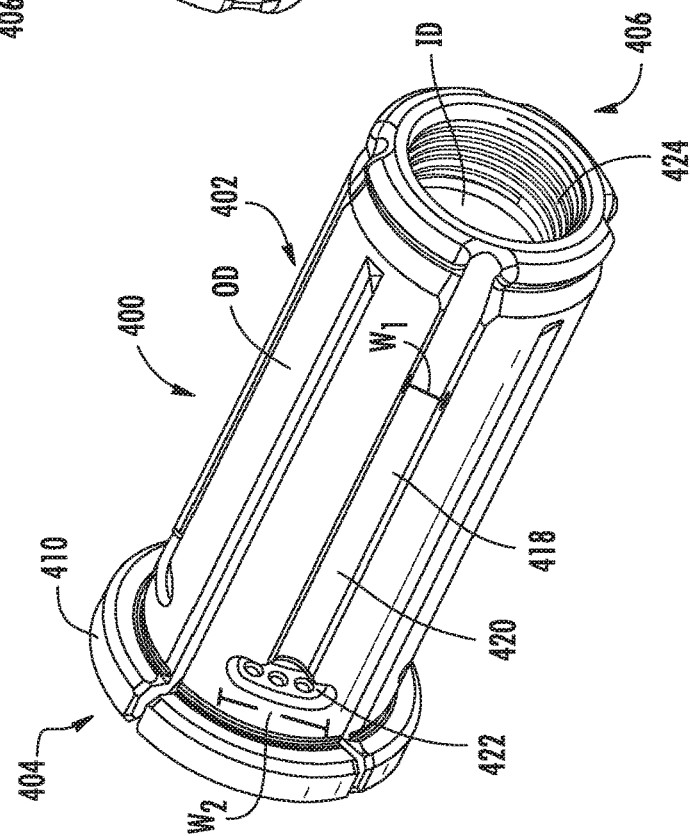

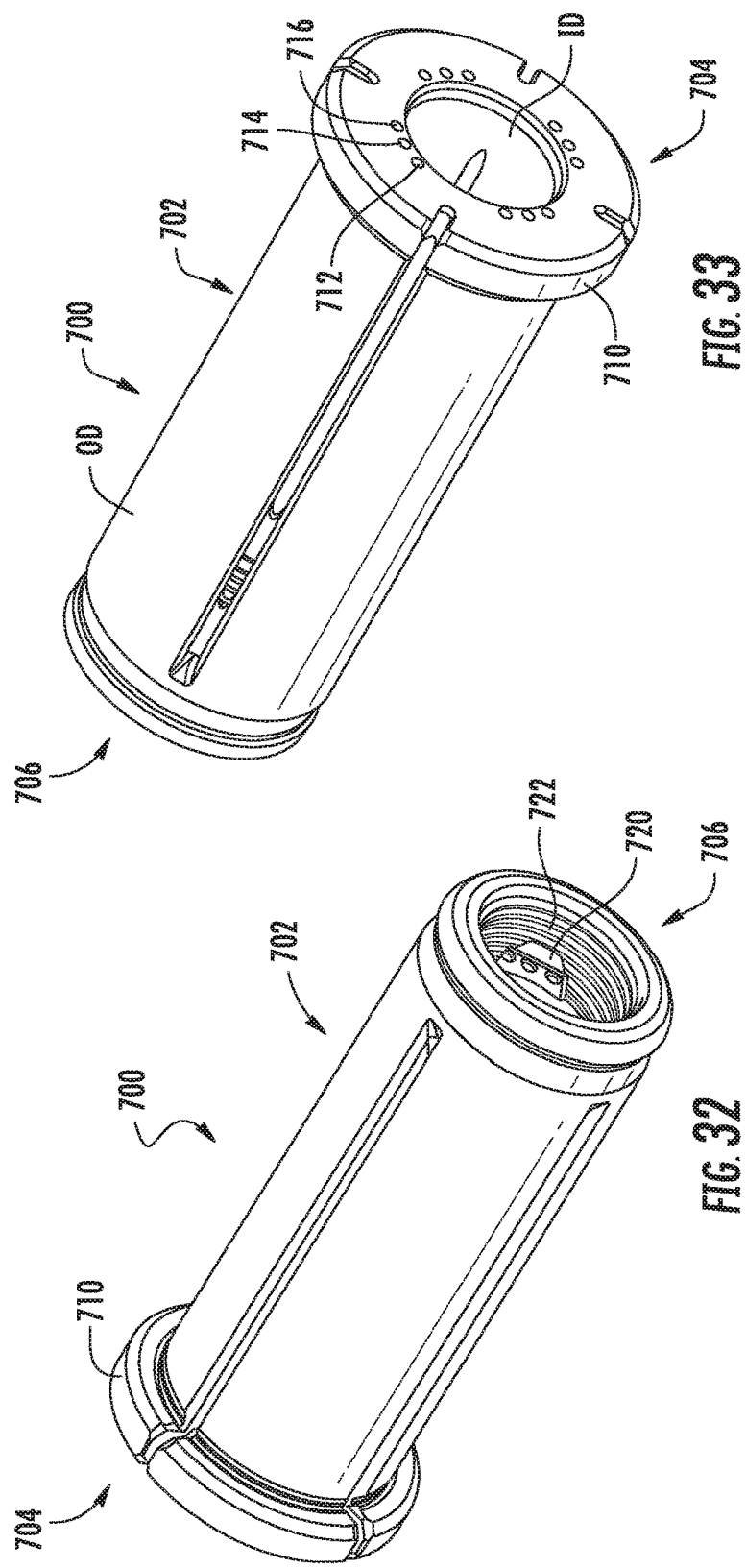

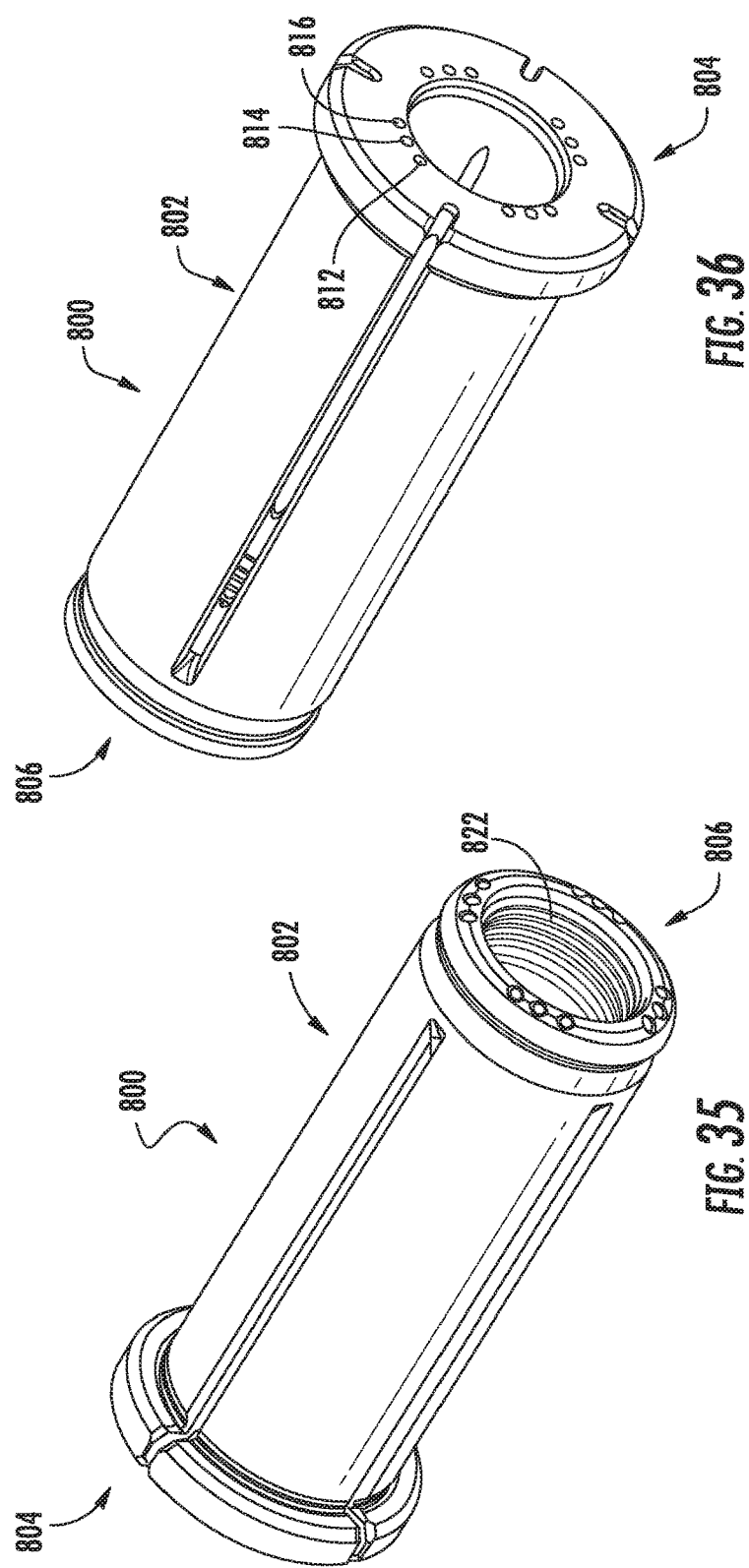

REDUCER SLEEVE WITH THRU COOLANT FLOW AND A CUTTING ASSEMBLY USING SUCH REDUCER SLEEVE

CLAIM FOR PRIORITY

This application is a continuation in part of U.S. patent application Ser. No. 14/669,298 filed Mar. 26, 2015. U.S. patent application Ser. No. 14/669,298 claims priority from Indian Patent Application No. 1800/CHE/2014 filed Apr. 4, 2014. The entirety of the foregoing applications are incorporated herein by reference.

BACKGROUND

The present invention relates to a reducer sleeve that is used in conjunction with another article such as, for example and without limitation, a hydraulic chuck or the like, as well as a cutting assembly that has a cutting tool and uses such a reducer sleeve. More specifically, the invention relates to such a reducer sleeve, as well as a cutting assembly having a cutting tool and using such a reducer sleeve, wherein the reducer sleeve contains structure through which coolant flows (i.e., a reducer sleeve with thru coolant flow) so as to effectively and efficiently deliver coolant to the cutting tool including selected regions of the cutting tool.

Heretofore, reducer sleeves have been known such as, for example those made and sold by Rego Fix, Obermattweg 60, 4456 Tenniken, Switzerland. While such reducer sleeves can be used in conjunction with cutting tools that have internal coolant channels, the reducer sleeve itself does not provide any coolant delivery feature. Therefore, reducer sleeves like the Rego Fix reducer sleeves cannot provide a coolant delivery feature to cutting tools that do not have their own internal coolant delivery such as, for example, some end mills and some drills. Therefore, it would be highly desirable to provide a reducer sleeve that provides for its own coolant delivery to the cutting tool of the cutting assembly of which it is a part. Further, it would be highly desirable to provide a cutting assembly that uses a reducer sleeve wherein the reducer sleeve provides for its own coolant delivery to the cutting tool. Such a reducer sleeve would be particularly useful to use in conjunction with cutting tools that do not have their own internal coolant delivery capabilities (e.g., some end mills and some drills).

When delivering coolant to an elongate cutting tool like an elongate drill, it is advantageous to be able to deliver coolant along the entire length of the cutting section of the drill. Therefore, it would highly desirable to provide a reducer sleeve that provides for its own coolant delivery along the entire length of the cutting section of the cutting tool of the cutting assembly of which it is a part. Further, it would be highly desirable to provide a cutting assembly that uses a reducer sleeve, which provides for its own coolant delivery along the entire length of the cutting section of the cutting tool.

When delivering coolant to a cutting tool, it is advantageous to deliver the coolant under sufficient pressure. The delivery of coolant at a sufficient pressure enhances the effective and efficient delivery of coolant to the cutting tool. Therefore, it would be highly desirable to provide a reducer sleeve that provides for its own coolant delivery under sufficient pressure to the cutting tool of the cutting assembly of which it is a part. Further, it would be highly desirable to provide a cutting assembly that uses a reducer sleeve, which provides for its own coolant delivery under sufficient pressure to the cutting tool.

SUMMARY OF THE INVENTION

In one aspect, reducer sleeves are described herein which address one or more of the above-identified needs. Further, reducer sleeves are described herein which provide one or more advantages over previously existing reducer sleeves. For example, in some embodiments, reducer sleeves described herein are capable of providing a coolant flow path without the need to provide coolant channels within a tool body or within a collet body. In certain other embodiments, reducer sleeves described herein are capable of delivering coolant to a plurality of different cutting zones of a cutting tool engaged with the reducer sleeve.

In some embodiments, reducer sleeves described herein comprise a reducer sleeve body having an axial forward end and an axial rearward end. The reducer sleeve body also defines a longitudinal axis. The reducer sleeve further comprises a flange disposed at the axial forward end of the reducer sleeve body, the flange defining a first nozzle disposed at a first radial distance from the longitudinal axis and a second nozzle disposed at a second radial distance from the longitudinal axis. The reducer sleeve body defines a first trough extending from the axial rearward end to the axial forward end. The first trough is in communication with the first nozzle and the second nozzle whereby the coolant is able to enter the first trough and flow along the first trough and into the first nozzle and the second nozzle such that coolant is ejected by the first nozzle and the second nozzle.

In certain other embodiments, reducer sleeves described herein comprise a reducer sleeve body defining a longitudinal axis and having an axial rearward end, an outer sidewall defining an outer diameter and an interior recess with an inner diameter. Reducer sleeves further comprise a flange disposed at the axial forward end of the reducer sleeve body. The flange defines a first nozzle disposed at a first radial distance from the longitudinal axis. The outer sidewall contains a longitudinally extending first internal coolant flow channel in communication with the first nozzle. The first nozzle is directed towards the longitudinal axis of the reducer sleeve body.

These and other embodiments will be described in further detail herein below.

BRIEF DESCRIPTION OF THE FIGURES

The following is a brief description of the drawings that form a part of this patent application:

FIG. 5 is a cross-sectional view of the assembly of the hydraulic chuck and the reducer sleeve taken along section line 5-5 of FIG. 1A;

FIG. 6 is a cross-sectional view of the assembly of the hydraulic chuck and the reducer sleeve showing the structural relationship between the bushing and the reducer sleeve including the sealing between the bushing and the reducer sleeve wherein the arrows show the coolant flow;

FIG. 7 is an enlarged view of the encircled region designated "7" of FIG. 6 showing the sealing between the bushing and the reducer sleeve;

FIG. 13 is an isometric view of another specific embodiment of a reducer sleeve assembled to the bushing and hydraulic chuck;

FIG. 16 is an isometric view of another specific embodiment of a reducer sleeve;

FIG. 17 is a front end view of the specific embodiment of the reducer sleeve of FIG. 16;

FIG. 20 is an isometric view of another specific embodiment of a reducer sleeve;

FIG. 21 is a rear end view of the reducer sleeve of FIG. 20;

FIG. 22 is a cross-sectional view of the reducer sleeve of FIG. 21 taken along section line 22-22 of FIG. 21;

FIG. 23 is an isometric view of another specific embodiment of a reducer sleeve.

FIG. 24 is another isometric view of the specific embodiment of the reducer sleeve of FIG. 23.

FIG. 32 is an isometric view of another specific embodiment of a reducer sleeve.

FIG. 33 is another isometric view of the specific embodiment of the reducer sleeve of FIG. 32.

FIG. 35 is an isometric view of another specific embodiment of a reducer sleeve.

FIG. 36 is another isometric view of the specific embodiment of the reducer sleeve of FIG. 35.

DETAILED DESCRIPTION

Reducer sleeves and tool systems comprising the same described herein below can be formed from any material and by any methods not inconsistent with the objectives of the present invention. For example, in some embodiments, reducer sleeves described herein can be formed by methods such as additive manufacturing.

Figure 1:
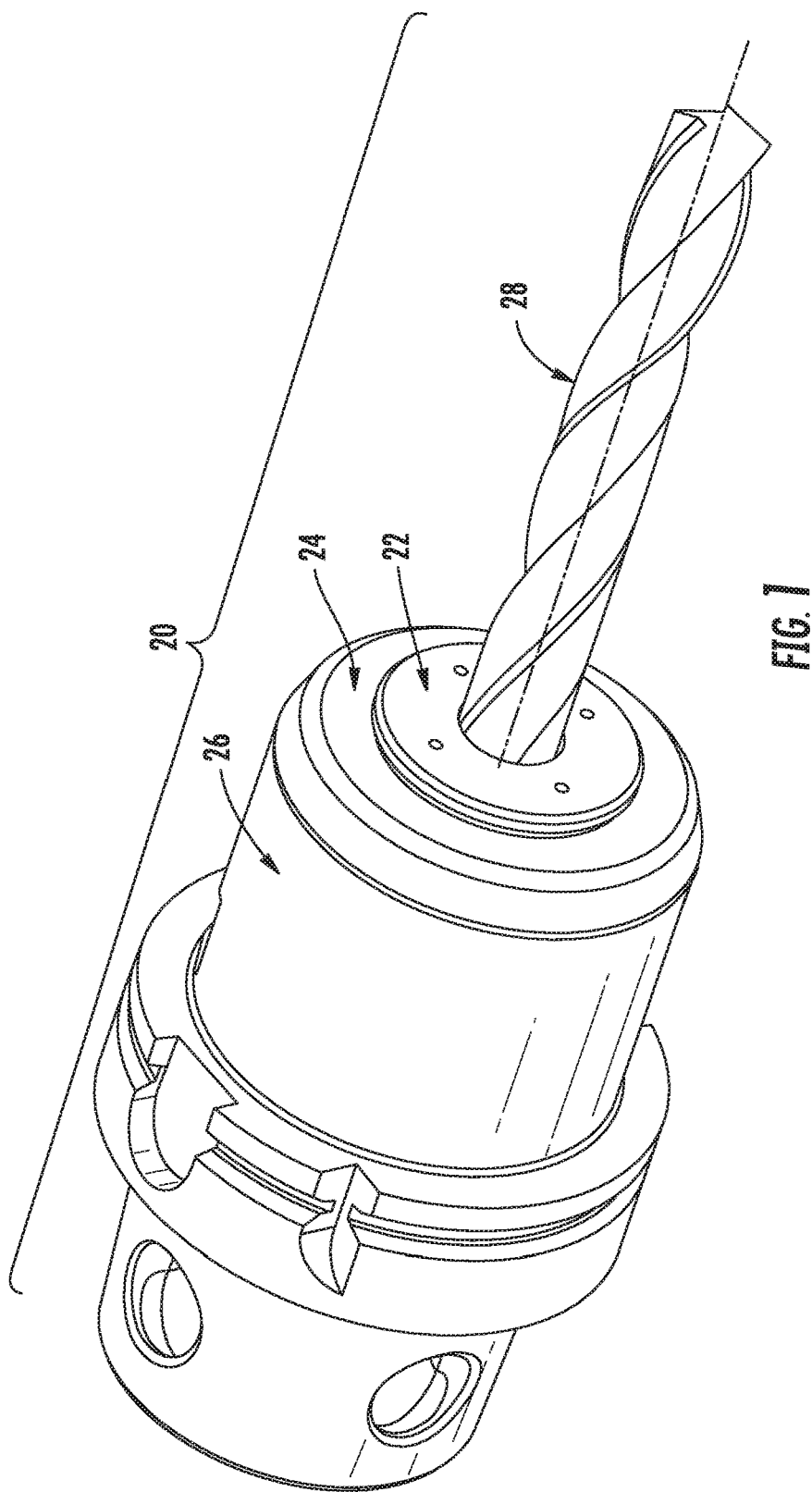
FIG. 1 is an isometric view of the cutting assembly comprising a hydraulic chuck, a bushing, a reducer sleeve, and a cutting tool.
Figure 1A:
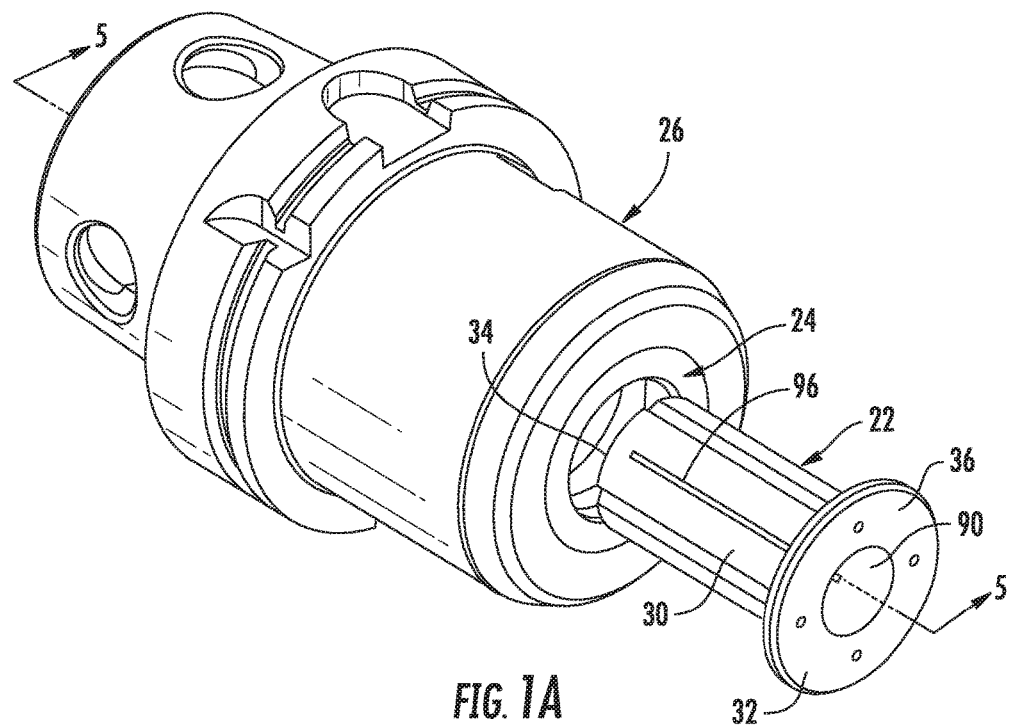
FIG. 1A is an isometric view of a hydraulic chuck with a specific embodiment of the reducer sleeve exploded away from the bushing contained in the hydraulic chuck.

Referring to the drawings, FIG. 1 illustrates the complete cutting assembly that is generally designated as 20. Cutting assembly 20 comprises a reducer sleeve generally designated as 22. As will become apparent, the reducer sleeve 22 is a reducer sleeve with thru coolant flow. The cutting assembly 20 further comprises a bushing generally designated as 24, a hydraulic chuck generally designated as 26, and a cutting tool generally designated as 28. In this specific embodiment of the cutting assembly 20, a hydraulic chuck 26 is illustrated; however, there is no intention to limit the invention in scope by the illustration of a hydraulic chuck. The reducer sleeves as shown herein can be used in conjunction with HPMC (milling chucks) and other tool adapters that are suitable to allow straight reducer sleeves. Further, in the specific embodiment of the cutting assembly 20, the cutting tool 28 is an elongate drill; however, there is no intention that the illustration of a drill should be limiting on the scope of the kind of cutting tool useful in the cutting assembly. There should be an understanding that the reducer sleeve 22 has application to a variety of cutting tools and cutting applications. FIG. 1A illustrates the reducer sleeve 22 exploded away from the bushing 24 in the hydraulic chuck 26. A description of each component of the cutting assembly 20 along with a more detailed description of the cutting assembly 20 now follows.

Referring especially to FIGS. 2, 3, 4A and 4B, the reducer sleeve 22 has an elongate reducer sleeve body 30 that is of a generally cylindrical geometry. The elongate reducer sleeve body 30 has an axial forward end 32 and an opposite axial rearward end 34. The reducer sleeve body 30 contains a central longitudinal sleeve bore 90 which is defined by a sleeve bore wall 92. The central longitudinal sleeve bore 90 has a central longitudinal sleeve bore axis A-A. See FIGS. 4A and 4B.

The reducer sleeve body 30 has an integral radially-oriented sleeve flange 36 at the axial forward end 32 thereof.

Figure 4A:
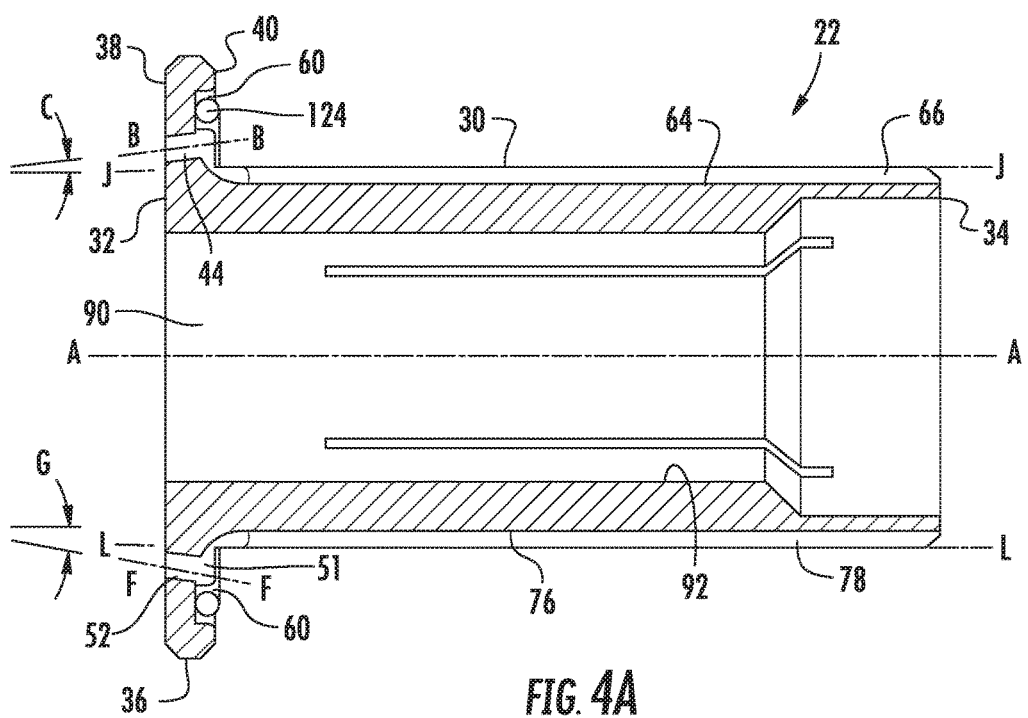
FIG. 4A is a cross-sectional view of the specific embodiment of the reducer sleeve of FIG. 3 taken along 4A-4A of FIG. 3.
Figure 4B:
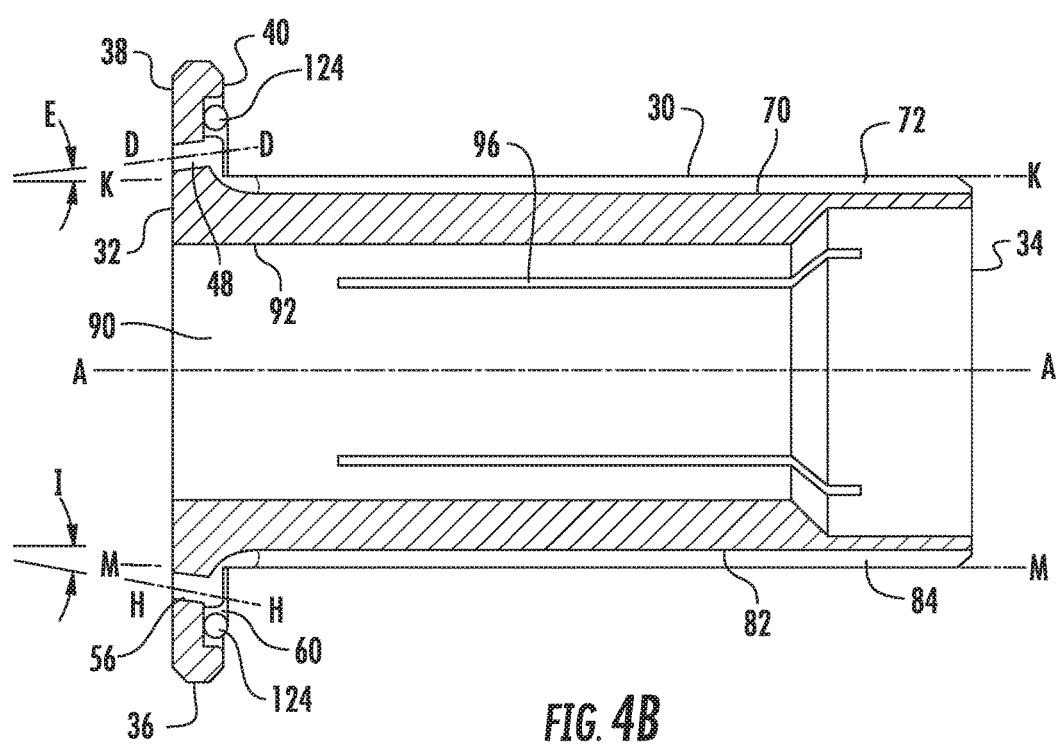
FIG. 4B is a cross-sectional view of the specific embodiment of the reducer sleeve of FIG. 3 taken along section 4B-4B of FIG. 3.

The sleeve flange 36 has a forward facing sleeve flange surface 38 and a rearward facing sleeve flange surface 40. As illustrated in FIGS. 4A and 4B, each of the forward facing sleeve flange surface 38 and the rearward facing sleeve flange surface 40 is disposed at an angle equal to about 90 degrees relative to the central longitudinal sleeve bore axis A-A.

The sleeve flange 36 contains a first recess 42 in the rearward facing sleeve flange surface 40. The sleeve flange 36 contains a first nozzle 44 therein wherein the first nozzle is in communication with the first recess 42. The first nozzle 44 has a central longitudinal first nozzle axis B-B. Referring to FIG. 4A, the central longitudinal first nozzle axis B-B is disposed at an angle C relative to the central longitudinal sleeve bore axis A-A. Angle C can range between about 5 degrees and about 30 degrees. In the specific embodiment, angle C is equal to about 7 degrees. The first nozzle 44 opens in the axial forward direction. As will be described hereinafter, the general orientation of the central axis of the coolant spray that exits the first nozzle 44 is at angle C relative to the central longitudinal sleeve bore axis A-A. As shown in FIG. 11 A, angle C is of a magnitude so that the coolant spray 160 impinges in the vicinity of the first cutting region 146.

The sleeve flange 36 further contains a second recess 47 in the rearward facing sleeve flange surface 40. The sleeve flange 36 contains a second nozzle 48 therein wherein the second nozzle 48 is in communication with the second recess 47. The second nozzle 48 has a central longitudinal second nozzle axis D-D. Referring to FIG. 4B, the central longitudinal second nozzle axis D-D is disposed at an angle E relative to the central longitudinal sleeve bore axis A-A. Angle E can range between about 5 degrees and about 30 degrees. In the specific embodiment, angle E is equal to about 9 degrees. The second nozzle 48 opens in the axial forward direction. As will be described hereinafter, the general orientation of the central axis of the coolant spray is at angle E relative to the central longitudinal sleeve bore axis A-A. As shown in FIG. 11 B, angle E is of a magnitude so that the coolant spray 162 impinges in the vicinity of the second cutting region 148.

The sleeve flange 36 contains a third recess 51 in the rearward facing sleeve flange surface 40. The sleeve flange 36 contains a third nozzle 52 therein wherein the third nozzle 52 is in communication with the third recess 51. The third nozzle 52 has a central longitudinal third nozzle axis F-F. Referring to FIG. 4A, the central longitudinal third nozzle axis F-F is disposed at an angle G relative to the central longitudinal sleeve bore axis A-A. Angle G can range between about 5 degrees and about 30 degrees. In the specific embodiment, angle G is equal to about 11 degrees. The third nozzle 52 opens in the axial forward direction. As will be described hereinafter, the general orientation of the central axis of the coolant spray is at angle G relative to the central longitudinal sleeve bore axis A-A. As shown in FIG. 11 C, angle G is of a magnitude so that the coolant spray 164 impinges in the vicinity of the third cutting region 150.

The sleeve flange 36 contains a fourth recess 55 in the rearward facing sleeve flange surface 40. The sleeve flange 36 contains a fourth nozzle 56 therein wherein the fourth nozzle 56 is in communication with the fourth recess 55. The fourth nozzle 56 has a central longitudinal fourth nozzle axis H-H. Referring to FIG. 4B, the central longitudinal first nozzle axis H-H is disposed at an angle I relative to the central longitudinal sleeve bore axis AA. Angle I can range between about 5 degrees and about 30 degrees. In the specific embodiment, angle I is equal to about 13 degrees. The fourth nozzle 56 opens in the axial forward direction. As will be described hereinafter, the general orientation of the central axis of the coolant spray is at angle I relative to the central longitudinal sleeve bore axis A-A. As shown in FIG. 11 D, angle I is of a magnitude so that the coolant spray 166 impinges in the vicinity of the fourth cutting region 152.

The sleeve flange 36 contains an annular seal channel 60 in the rearward facing sleeve flange surface 40. As will be described hereinafter, a resilient seal 124 is carried in the seal channel 60. Resilient seal 124 provides for a fluid-tight seal between the bushing 24 and the reducer sleeve 22.

Still referring to the reducer sleeve body 30, the reducer sleeve body 30 contains a first elongate sleeve depression 64 which defines a first trough 66. The first trough 66 has a central longitudinal first trough axis J-J. The first trough 66 has an orientation such that the central longitudinal first trough axis J-J is generally parallel to the central longitudinal sleeve bore axis A-A. In the specific embodiment, the depth of the first trough 66 is generally constant along its entire axial length. However, there should be an appreciation that the depth of the first trough 66 can change along the axial length thereof. Although there is a description hereinafter, the first trough 66 carries coolant along its length whereby the coolant is received in the first recess 42 so as to pass into the first nozzle 44 whereby the first nozzle emits a coolant spray.

The reducer sleeve body 30 contains a second elongate sleeve depression 70 which defines a second trough 72. The second trough 72 has a central longitudinal second trough axis K-K. The second trough 72 has an orientation such that the central longitudinal second trough axis K-K is generally parallel to the central longitudinal sleeve bore axis A-A. In the specific embodiment, the depth of the second trough 72 is generally constant along its entire axial length. However, there should be an appreciation that the depth of the second trough 72 can change along the axial length thereof. Although there is a description hereinafter, the second trough 72 carries coolant along its length whereby the coolant is received in the second recess 47 so as to pass into the second nozzle 48 whereby the second nozzle 48 emits a coolant spray.

The reducer sleeve body 30 further contains a third elongate sleeve depression 76 which defines a third trough 78. The third trough 78 has a central longitudinal third trough axis L-L. The third trough 78 has an orientation such that the central longitudinal first trough axis L-L is generally parallel to the central longitudinal sleeve bore axis A-A. In the specific embodiment, the depth of the third trough 78 is generally constant along its entire axial length. However, there should be an appreciation that the depth of the third trough 78 can change along the axial length thereof. Although there is a description hereinafter, the third trough 78 carries coolant along its length whereby the coolant is received in the third recess 51 so as to pass into the third nozzle 52 whereby the third nozzle emits a coolant spray.

The reducer sleeve body 30 contains a fourth elongate sleeve depression 82 which defines a fourth trough 84. The fourth trough 84 has a central longitudinal fourth trough axis M-M. The fourth trough 84 has an orientation such that the central longitudinal fourth trough axis M-M is generally parallel to the central longitudinal sleeve bore axis A-A. In the specific embodiment, the depth of the fourth trough 84 is generally constant along its entire axial length. However, there should be an appreciation that the depth of the fourth trough 84 can change along the axial length thereof. Although there is a description hereinafter, the fourth trough 84 carries coolant along its length whereby the coolant is received in the fourth recess 55 so as to pass into the fourth nozzle 56 whereby the fourth nozzle 56 emits a coolant spray.

The reducer sleeve body 30 contains a plurality of elongate slots 96. These elongate slots 96 have a generally longitudinal orientation and provide a radial flexibility to the reducer sleeve body 30.

The specific embodiment contains four troughs (66, 72, 78, 84) that are generally equi-spaced about the circumference of the reducer sleeve body 30. There should be the appreciation that the number of troughs can vary and the spacing between the troughs can vary depending upon the specific application. The cross-section of the troughs (66, 72, 78, 84) can vary depending upon the specific application. For example, the cross-section may be (without limitation) rectangular or triangular. The angles (C, E, G, I) of the nozzles (44, 48, 52, 56) can also vary depending upon the specific application and desired coolant delivery characteristics. As is apparent from FIGS. 11A through 11D, the angles C, E, G and I vary such that coolant sprays impinge along the entire length of the cutting section 144 of the cutting tool 28.

Figure 2:
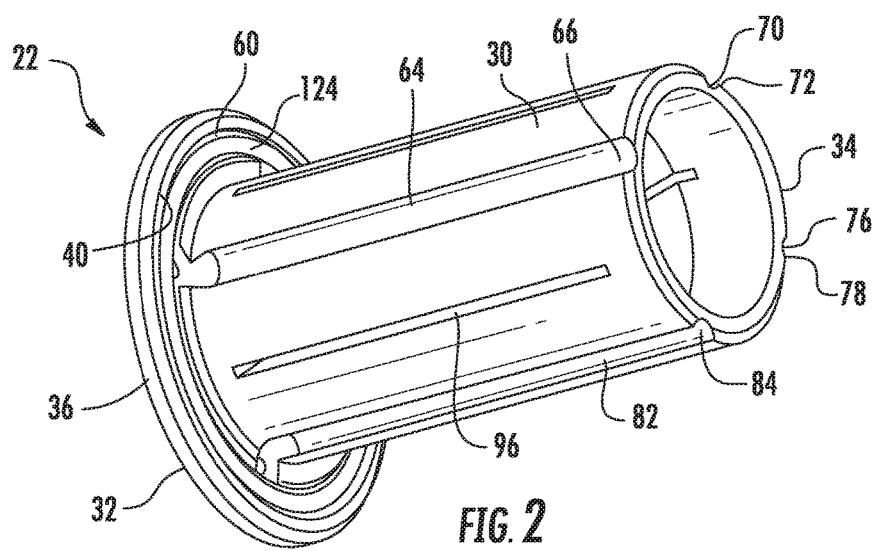
FIG. 2 is an isometric view of a specific embodiment of the reducer sleeve of FIG. 1.
Figure 2A:
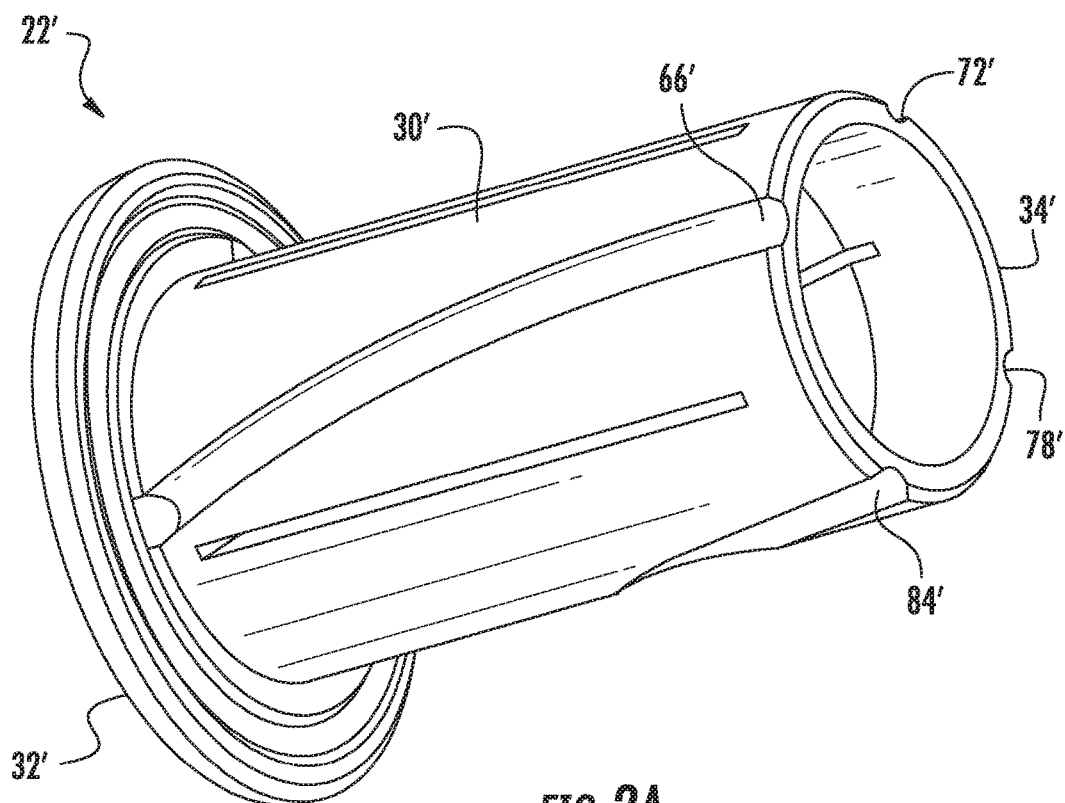
FIG. 2A is an isometric view of a specific embodiment of the reducer sleeve wherein the troughs have a spiral orientation.
Figure 3:
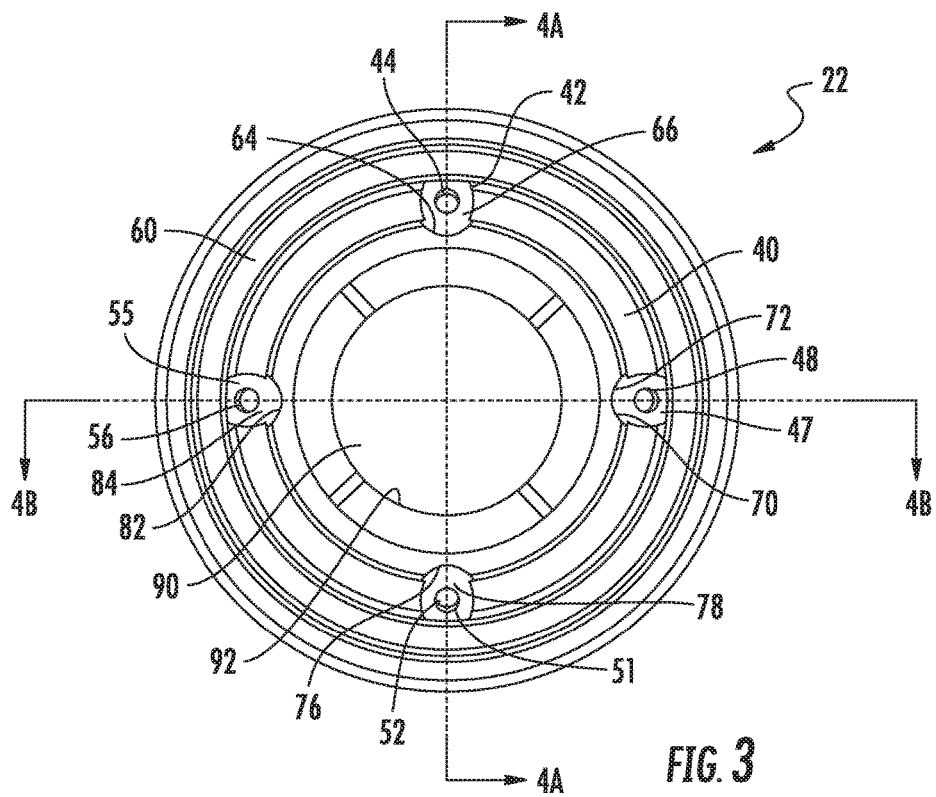
FIG. 3 is an end view of the specific embodiment of the reducer sleeve of FIG. 1.

FIG. 2A illustrates an alternate specific embodiment of the reducer sleeve 22' with thru coolant flow wherein the troughs are spiral in orientation. More specifically, reducer sleeve body 30' has an axial forward end 32' and an opposite axial rearward end 34'. The reducer sleeve body 30' contains four spiral troughs comprising a first spiral trough 66', a second spiral trough 72', a third spiral trough 78', and a fourth spiral trough 84'. The extent of the twist in the spiral orientation can vary depending upon the specific application for the reducer sleeve 22'. Further, the cross-sectional geometry of the troughs, the spacing between the troughs, and the number of troughs can vary depending upon the specific application.

Referring to the bushing 24, the bushing 24 has an elongate bushing body 102 that has an axial forward bushing end 104 and an opposite axial rearward bushing end 106. The elongate bushing body 102 is of a generally cylindrical geometry. The bushing body 102 has an integral radially-oriented bushing flange 108 at the axial forward bushing end 104 thereof. The bushing flange 108 has a forward facing bushing flange surface 110 and a rearward facing bushing flange surface 112. Each of the forward facing bushing flange surface 110 and the rearward facing bushing flange surface 112 is disposed at an angle equal to about 90 degrees relative to the central longitudinal sleeve bore axis A-A. The bushing body 102 contains a central longitudinal bushing bore 116 which is defined by a bushing bore wall 118. The central longitudinal bushing bore 116 has a central longitudinal bushing bore axis that is generally parallel to the central longitudinal sleeve bore axis A-A.

As mentioned hereinabove, there is an annular resilient seal 124 located between the reducer sleeve 22 and the bushing 24. More specifically, the seal 124 is carried in the annular channel 60 in the rearward facing sleeve flange surface 40. When the reducer sleeve 22 is assembled to the bushing 24, resilient seal 124 is compressively sandwiched between the rearward facing sleeve flange surface 40 and the forward facing bushing flange surface 110. The seal 124 functions to provide a fluid-tight seal between the reducer sleeve 22 and the bushing 24 when the bushing 24 and the reducer sleeve 22 are assembly together. Such a fluid-tight seal enhances the efficiency and effectiveness of the reducer sleeve 22 to deliver coolant to the cutting tool 28.

In this specific embodiment, the cutting tool 28 is an elongate drill that has a distal end 140 and an opposite proximate end 142. The drill has a generally cylindrical geometry. The drill 28 has a shank section 143 adjacent the proximate end 142. In this specific embodiment, the drill 28 has a cutting section 144 that comprises four cutting regions. The first cutting region 146 is adjacent to the distal end 140. A second cutting region 148 is adjacent the first cutting region 146 and is closer to the proximate end 142 than the first cutting region 146. A third cutting region 150 is adjacent to the second cutting region 148 and is closer to the proximate end 142 than the second cutting region 148. A fourth cutting region 152 is adjacent to the third cutting region 150 and is closer to the proximate end 142 than the third cutting region 150.

The hydraulic chuck 26 contains a chuck bore 130 and a coolant entry 132.

In reference to the assembly of the cutting assembly 20, the bushing 24 is contained within the chuck bore 130, the reducer sleeve 22 is contained within the bushing bore 116, and the cutting tool 28 is contained within the reducer sleeve bore 90. As described above, the resilient seal 124 is compressively sandwiched between the rearward facing sleeve flange surface 40 and the forward facing bushing flange surface 110. The resilient seal 124 functions to provide a fluid-tight seal between the reducer sleeve 22 is assembled to the bushing 24.

Figure 8:
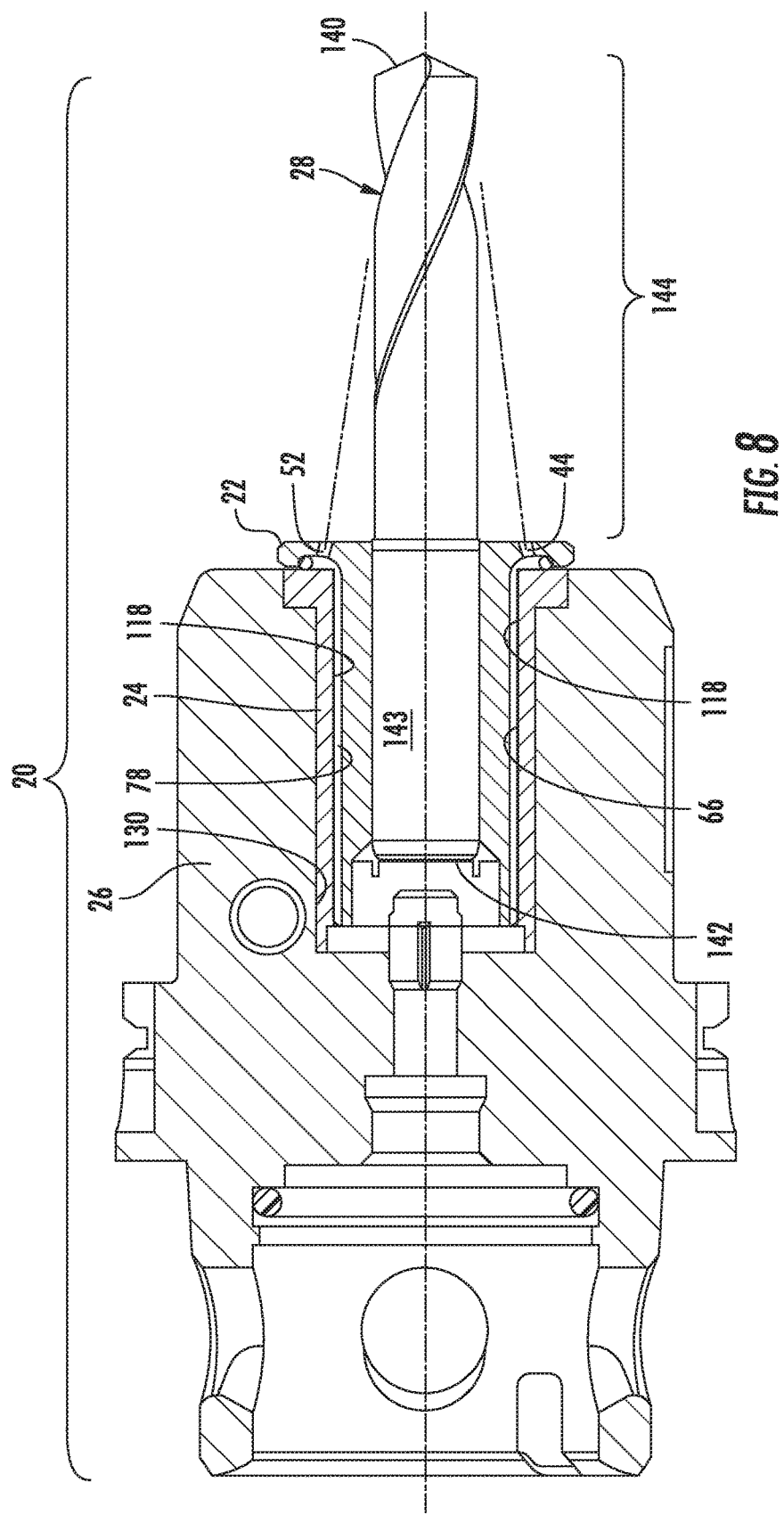
FIG. 8 is a cross-sectional view of the cutting assembly showing the cutting tool (i.e., a drill) secured to the hydraulic chuck and wherein the hydraulic chuck, bushing and reducer sleeve are illustrated in cross-section.

As shown in FIG. 8, the bushing bore wall 118 and the third trough 78 essentially define a fluid passage through which coolant passes to the third nozzle 52. As also shown in FIG. 8, the bushing bore wall 118 and the first trough 66 through which coolant flows to the first nozzle 44. The bushing bore wall 118 also cooperates with the second trough 72 and the fourth trough 84 to define two additional flow passages through which coolant passes to the second nozzle 48 and the fourth nozzle 56, respectively. There should be an appreciation that the flow passages are fluidly isolated from one another.

Figure 11A:
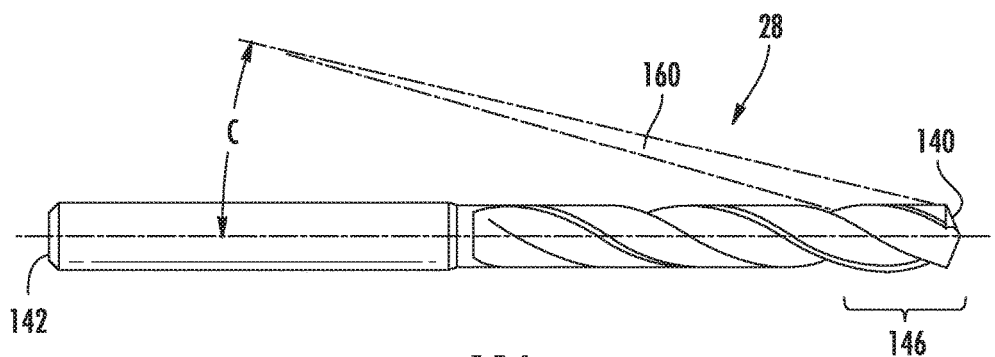
FIG. 11A is a schematic view of the cutting tool, i.e., a drill, showing a first angle at which coolant impinges on a first cutting region of the cutting tool.
Figure 11B:
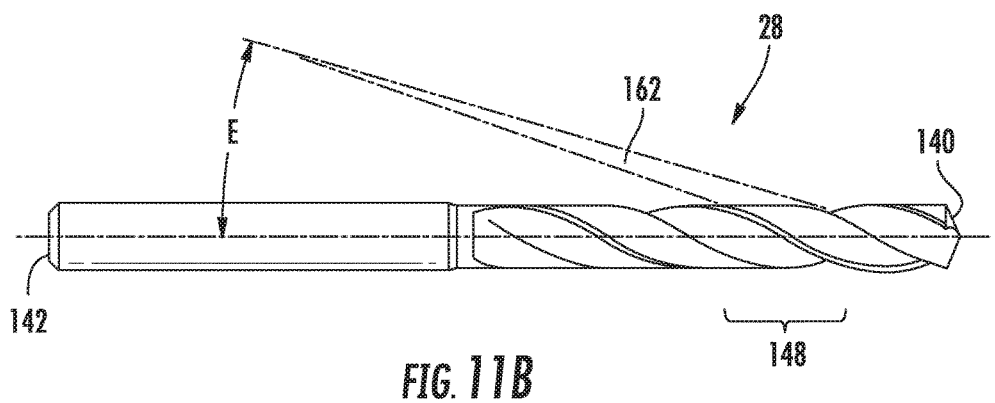
FIG. 11B is a schematic view of the cutting tool, i.e., a drill, showing a second angle at which coolant impinges on a second cutting region of the cutting tool.
Figure 11C:
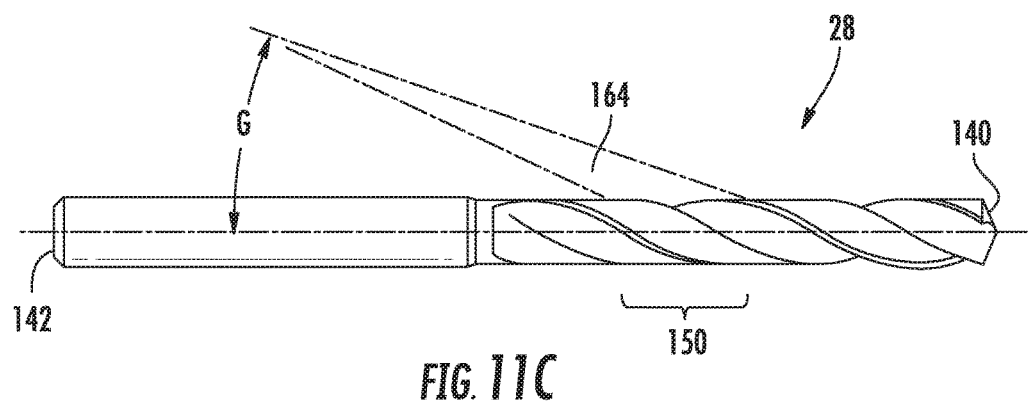
FIG. 11C is a schematic view of the cutting tool, i.e., a drill, showing a third angle at which coolant impinges on a third cutting region of the cutting tool.
Figure 11D:
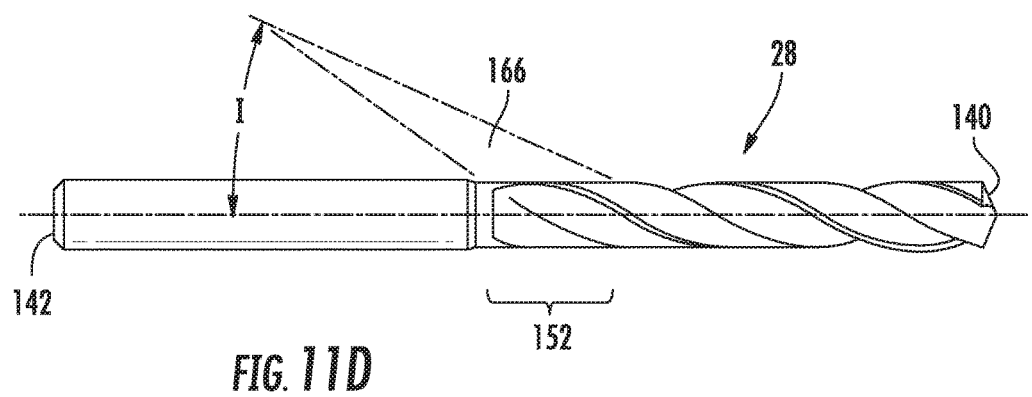
FIG. 11D is a schematic view of the cutting tool, i.e., a drill, showing a fourth angle at which coolant impinges on a fourth cutting region of the cutting tool.

In reference to the operation of the cutting assembly 20, coolant under pressure is supplied to the hydraulic chuck 26 through the coolant entry 132. The coolant flows through troughs (66, 72, 78, 84) and into the corresponding recesses (42, 47, 51, 55) and then into and out of the corresponding nozzles (44, 48, 52, 56). Each of the nozzles (44, 48, 52, 56) has an orientation relative to the central longitudinal sleeve bore axis A-A that is different. More specifically, each of the nozzles (44, 48, 52, 56) has an orientation relative to the central longitudinal sleeve bore axis A-A that provides for each of the four nozzles (44, 48, 52, 56) to spray or deliver coolant to a selected cutting region (146, 148, 150, 152). Referring to FIGS. 11A through 11D, FIG. 11A shows that the first nozzle 44 delivers coolant at an angle C such that the coolant impinges upon (or in the general vicinity of) the first cutting region 146. FIG. 11B shows that the second nozzle 48 delivers coolant at an angle E such that the coolant impinges upon (or in the general vicinity of) the second cutting region 148. FIG. 11C shows that the third nozzle 52 delivers coolant at an angle G such that the coolant impinges upon (or in the general vicinity of) the third cutting region 150. FIG. 11D shows that the fourth nozzle 56 delivers coolant at an angle I such that the coolant impinges upon (or in the general vicinity of) the fourth cutting region 152.

Figure 9:
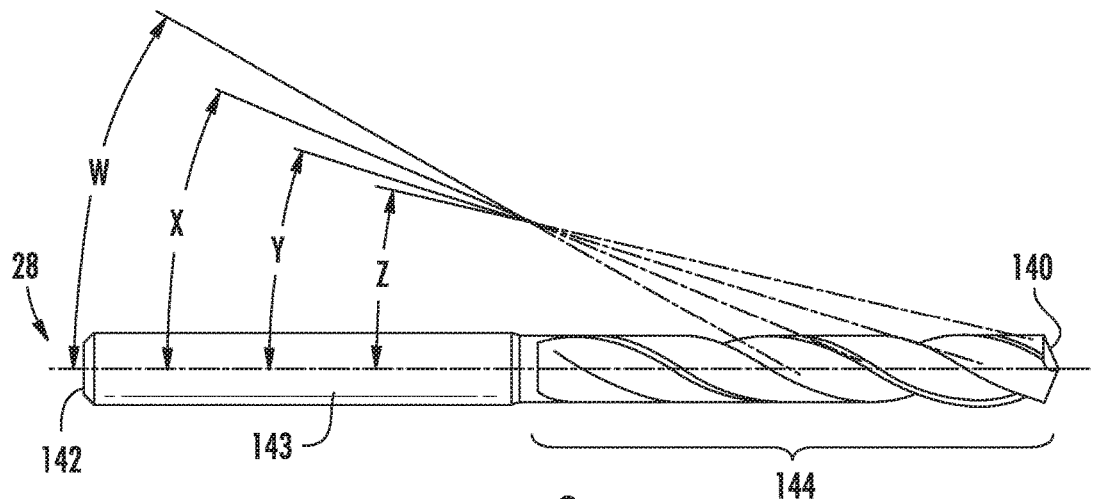
FIG. 9 is a schematic view of a cutting tool, i.e., a drill, showing the impingement of four coolant streams at different locations along a portion of the length of the cutting section of the drill.
Figure 10:
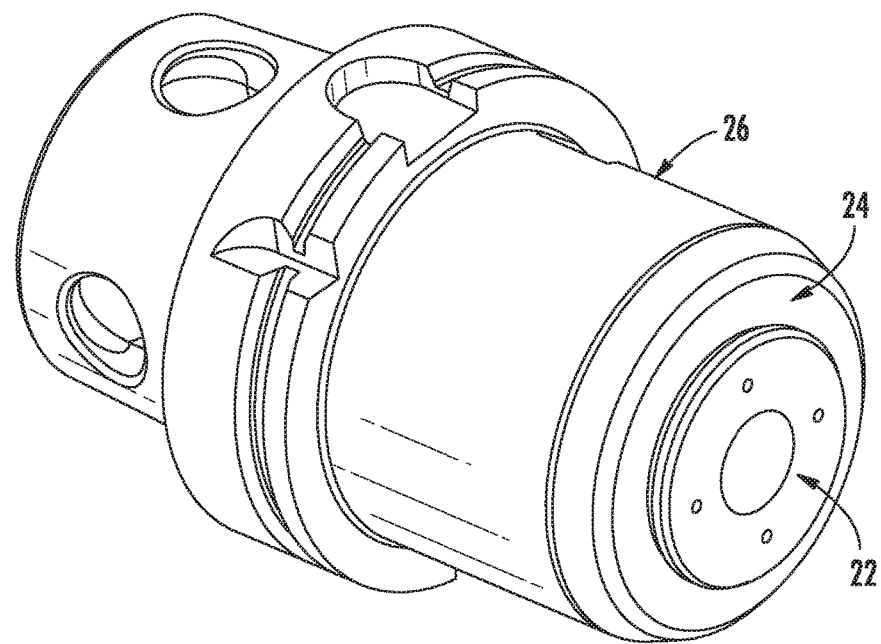
FIG. 10 is an isometric view of the reducer sleeve assembled to the bushing and the hydraulic chuck.

FIG. 9 illustrates in schematic form an arrangement in which four coolant streams impinge on the portion of the cutting tool adjacent the distal end thereof. The angles at which the nozzles are oriented are W, X, Y and Z. Specific angles can be W=13 degrees, X=11 degrees, Y=9 degrees and Z=7 degrees.

Figure 12:
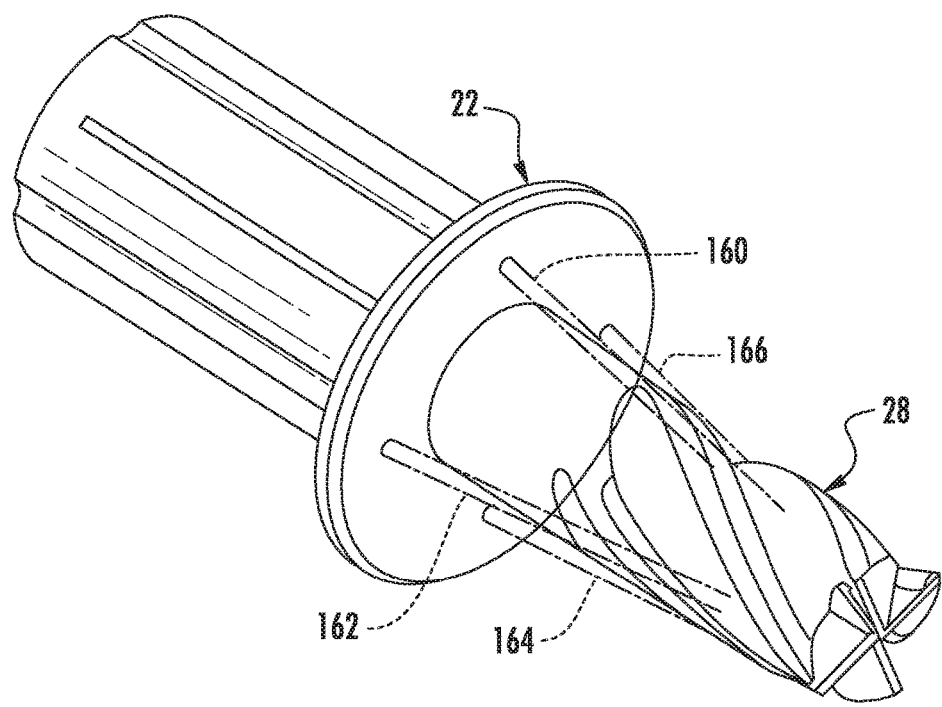
FIG. 12 is an isometric view that shows the four coolant streams spraying from the nozzles in the reducer sleeve and impinging upon the cutting tool.

Referring to FIG. 12, there is an isometric view that shows the four coolant streams (160, 162, 164, 166) spraying from the nozzles in the reducer sleeve 22. The coolant streams (160, 162, 164, 166) impinge upon the cutting tool 28 at different regions or locations along the axial length thereof. There should be an appreciation that the coolant streams (160, 162, 164, 166) typically diverge in a radial outward direction as they travel away from the nozzles. While the focus of the impingement could be on only one region of the cutting tool, in this embodiment, the coolant impinges along the entire axial length of the cutting region of the cutting tool.

Figure 15:
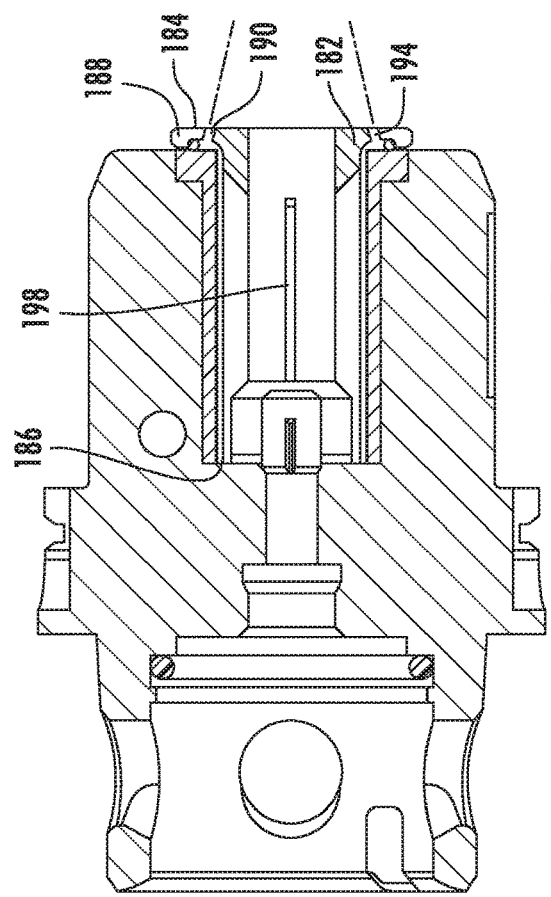
FIG. 15 is a cross-sectional view of the assembly of FIG. 14 taken along section line 15-15 of FIG. 14.
Figure 14:
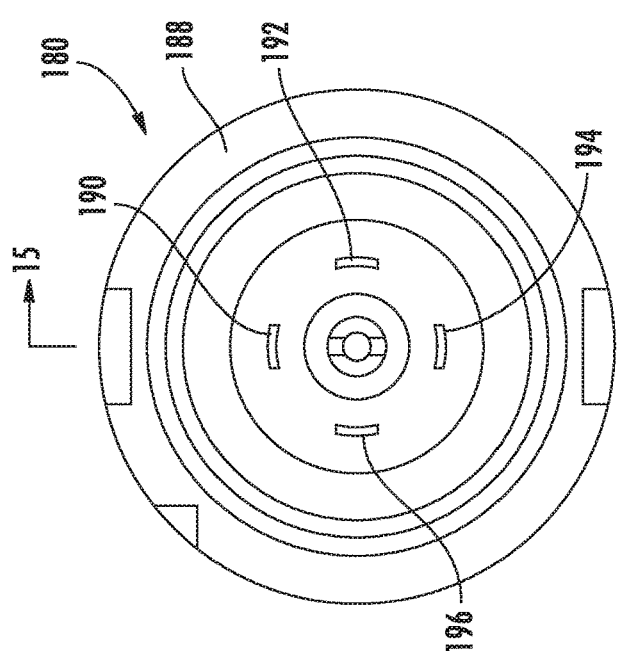
FIG. 14 is an end view of the assembly of FIG. 13.
Figure 19:
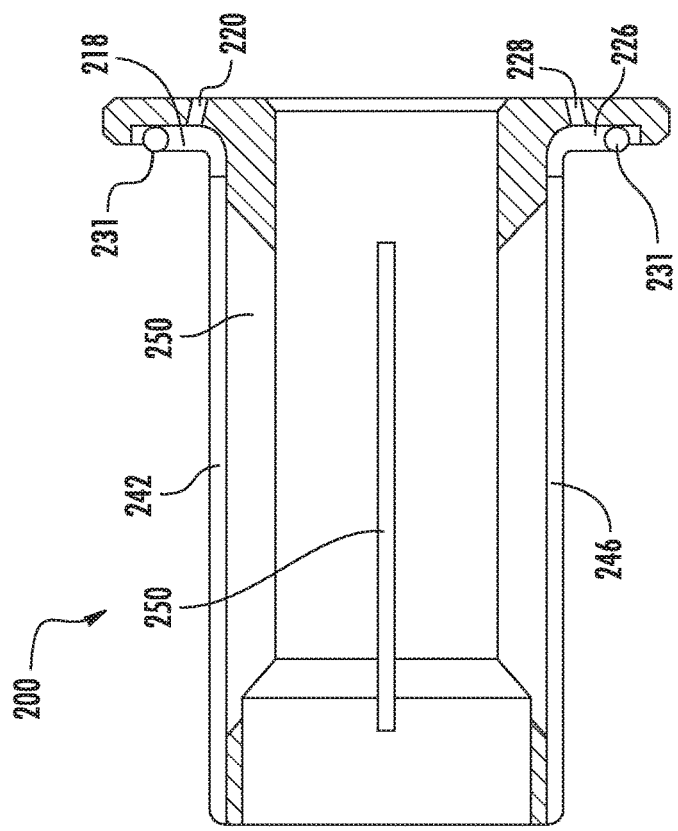
FIG. 19 is a cross-sectional view of the reducer sleeve of FIG. 18 taken along section line 19-19 of FIG. 18.
Figure 18:
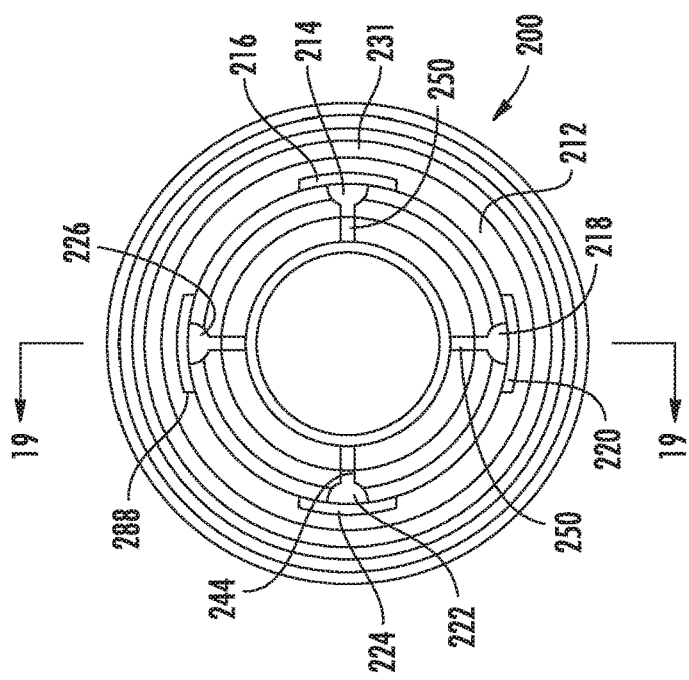
FIG. 18 is a rear end view of the specific embodiment of the reducer sleeve of FIG. 16.

FIGS. 13 through 15 illustrate another specific embodiment of the reducer sleeve with thru coolant flow generally designated as 180 wherein the reducer sleeve 180 is within the bore of the bushing 24 which is held in the hydraulic chuck 26. Reducer sleeve 180 comprises a reducer sleeve body 182 that has an axial forward end 184 and an opposite axial rearward end 186. The reducer sleeve body 182 has a sleeve flange 188 that extends the radial outward direction. The reducer sleeve body 182 contains four oblong nozzles (190, 192, 194, 196) through which coolant sprays. The reducer sleeve body 182 further contains an elongate slot 198 between each of the troughs. The remainder of the structure of the reducer sleeve 180 is along the lines of the reducer sleeve 22, except that the nozzles (190, 192, 194, 196) are oblong (or elongate) and not generally circular as in reducer sleeve 22. There should be an appreciation that the nozzles can be of one of any number of geometries depending upon the specific application. The selection of the nozzle geometry can correspond to the specific application for the reducer sleeve 180.

FIGS. 16 through 19 illustrate another specific embodiment of the reducer sleeve with thru coolant flow generally designated as 200. As will become apparent, the reducer sleeve 200 has a structure along the lines of the earlier reducer sleeve 180, except that an elongate slot 250 is located in each trough wherein the slot 250 provides a radial flexibility to the reducer sleeve body. Reducer sleeve 200 has a reducer sleeve body 202 that has an axial forward end 204 and an opposite axial rearward end 206. The reducer sleeve body 202 has a sleeve flange 208 that extends in a radial outward direction from the reducer sleeve body 202. The sleeve flange 208 has an axial forward facing sleeve surface 210 and an axial rearward facing sleeve surface 212.

The sleeve flange 208 contains a first recess 214 in communication with a first oblong nozzle 216. A first trough 240 is in communication with and provides coolant flow to the first recess 214 and then to the first oblong nozzle 216. The sleeve flange 208 contains a second recess 218 in communication with a second oblong nozzle 220. A second trough 242 is in communication with and provides coolant flow to the second recess 218 and then to the second oblong nozzle 220. The sleeve flange 208 contains a third recess 222 in communication with a third oblong nozzle 224. A third trough 244 is in communication with and provides coolant flow to the third recess 222 and then to the third oblong nozzle 224. The sleeve flange 208 contains a fourth recess 226 in communication with a fourth oblong nozzle 228. A fourth trough 246 is in communication with and provides coolant flow to the fourth recess 226 and then to the fourth oblong nozzle 228.

There should be an appreciation that the geometry or shape of the coolant stream spraying from the oblong nozzles is different from that spraying from the nozzles with a generally circular cross-section. There should also be an appreciation that the geometry or configuration of the nozzle in the flange of the reducer sleeve may be of anyone of a number of suitable geometries that adapts to a specific application. There is no intention to be limited to an oblong nozzle or a nozzle of a generally circular shape.

A resilient seal 231 provides for a fluid-tight seal between the reducer sleeve 200 and the bushing along the lines of the fluid-tight seal between reducer sleeve 22 and the bushing 24.

Each one of the troughs (240, 242, 244, 246) contains an elongate slot 250 therein wherein the elongate slot 250 provides a radial flexibility to the reducer sleeve 200.

FIGS. 20 through 22 illustrate another specific embodiment of the reducer sleeve with thru coolant flow generally designated as 260. Reducer sleeve 260 has a structure generally along the same lines as reducer sleeve 200, except that the nozzles are of a generally circular cross-section as opposed to an oblong geometry. Reducer sleeve 260 has a reducer sleeve body 262 that has an axial forward end 264 and an opposite axial rearward end 266. The reducer sleeve body 262 has a sleeve flange 268 that extends in a radial outward direction from the reducer sleeve body 262. The sleeve flange 268 has an axial forward facing sleeve surface 270 and an axial rearward facing sleeve surface 272.

The sleeve flange 268 contains a first recess 274 in communication with a first oblong nozzle 276. A first trough 290 is in communication with and provides coolant flow to the first recess 274 and then to the first nozzle 276. The sleeve flange 268 contains a second recess 278 in communication with a second nozzle 280. A second trough 292 is in communication with and provides coolant flow to the second recess 278 and then to the second nozzle 280. The flange 268 contains a third recess 282 in communication with a third nozzle 284. A third trough 294 is in communication with and provides coolant flow to the third recess 282 and then to the third nozzle 284. The flange 268 contains a fourth recess 286 in communication with a fourth nozzle 288. A fourth trough 296 is in communication with and provides coolant flow to the fourth recess 286 and then to the fourth nozzle 288.

A seal 301 provides for a fluid-tight seal between the reducer sleeve 260 and the bushing along the lines of the fluid-tight seal between reducer sleeve 22 and the bushing 24. Each one of the troughs (290, 292, 294, 296) contains an elongate slot 300 therein wherein the elongate slot 300 provides a radial flexibility to the reducer sleeve 260.

Figure 25:
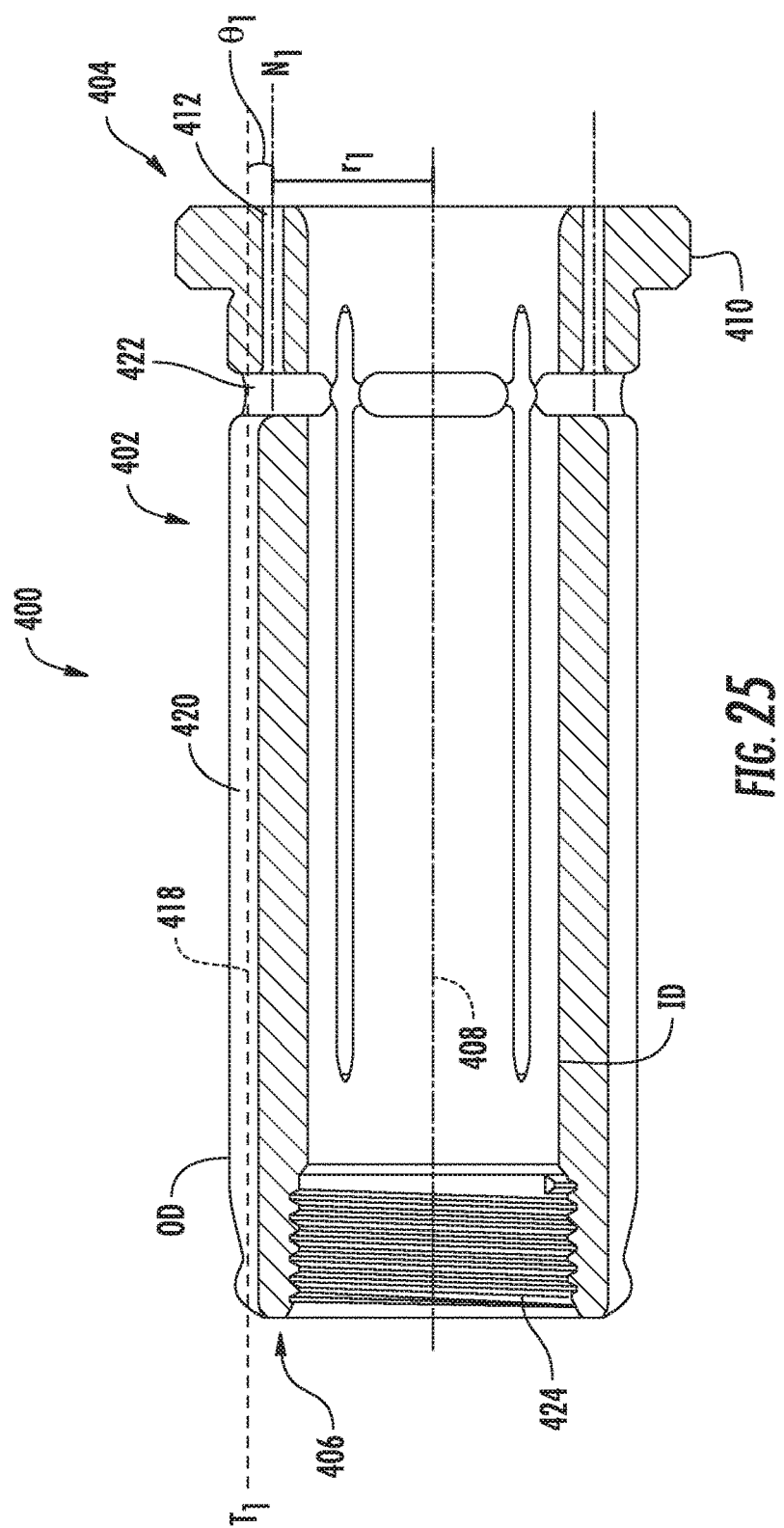
FIG. 25 is a cross-sectional view of the reducer sleeve of FIG. 23 taken along a plane containing the longitudinal axis.

FIGS. 23 through 25 illustrate another specific embodiment of a reducer sleeve described herein, generally designated as 400. The reducer sleeve 400 comprises a reducer sleeve body 402 having an axial forward end 404 and an axial rearward end 406 and defines a longitudinal axis 408. A flange 410 is disposed at the axial forward end 404 of the reducer sleeve body 402. The flange 410 defines a first nozzle 412 disposed at a first radial distance $r_1$ from the longitudinal axis 408 and a second nozzle 414 disposed at a second radial distance (not shown) from the longitudinal axis 408. The reducer sleeve body 402 defines a first trough 418 extending from the axial rearward end 406 to the axial forward end 404. The first trough 418 is in communication with the first nozzle 412 and the second nozzle 414 whereby coolant is able to enter the first trough 418 and flow along the first trough 418 and into the first nozzle 412 and the second nozzle 414 such that coolant is ejected by the first nozzle 412 and the second nozzle 414.

In some embodiments, the first distance $r_1$ is substantially the same as the second distance, as shown in FIGS. 23 through 25. However, consistent with other embodiments of the present invention, certain embodiments of reducer sleeves described herein are configured such that the first distance $r_1$ is greater than the second distance. This configuration may permit variable distance coolant flow from a single trough without adjustment of the trough, coolant flow rate, or nozzle angle to accommodate cooling multiple zones of a cutting tool. Thus, in certain embodiments, at least one of the first nozzle 412 and the second nozzle 414 is directed at the longitudinal axis 408 of the reducer sleeve body 402. In certain embodiments, each of the first nozzle 412 and the second nozzle 414 is directed at the longitudinal axis 408 of the reducer sleeve body 402.

In some embodiments, as shown in FIGS. 23 through 25, the first trough 418 defines a longitudinal portion 420 and a radial portion 422. The longitudinal portion 420 extends generally parallel to the longitudinal axis 408 and extends from the outer diameter OD of the reducer sleeve body 402. The radial portion 422 extends generally orthogonal to the longitudinal axis and extends from the outer diameter OD of the reducer sleeve body 402 to an inner diameter ID of the reducer sleeve body 402. The radial portion 422 of the first trough is adjacent to and is in communication with the first nozzle 412 and the second nozzle 412. In certain embodiments, as in FIGS. 23 through 25, the longitudinal portion 420 of the first trough 418 defines a first width $w_1$ measured along the outer diameter OD of the reducer sleeve body 402, the radial portion 422 of the first trough 418 defines a second width $w_2$ measured along the outer diameter OD of the reducer sleeve body 402, and the second width $w_2$ is greater than the first width $w_1$. In such configurations, coolant from a single trough may feed directly into multiple nozzles in a variety of configurations. Further, such a configuration, disposing the reducer sleeve into a tool holder with a cutting tool shank within the recess of the reducer sleeve and applying a clamping force, such as by hydraulic clamping, effectively forms a fluid-tight seal on the inner diameter and outer diameter sides of the radial portion of the trough. Therefore, in such embodiments, the radial portion forms a closed fluid distribution chamber to flow freely into the first, second, and subsequent nozzles. The radial portion 422 of the first trough 418 may have any shape or configuration not inconsistent with the objectives of the present invention. For example, in some embodiments, the radial portion 422 comprises one of an oblong or a substantially circular cross-sectional shape when viewed from the outer diameter OD of the reducer sleeve body 402.

It is therefore apparent that the present invention provides a reducer sleeve that is used in conjunction with another article such as, for example and without limitation, a hydraulic chuck or the like, as well as a cutting assembly that uses such reducer sleeve. It is also apparent that the present invention provides a reducer sleeve, as well as a cutting assembly having a cutting tool and using such reducer sleeve, wherein the reducer sleeve contains structure through which coolant flows so as to effectively and efficiently deliver coolant to the cutting tool.

In some embodiments, the first nozzle 412 defines a central longitudinal first nozzle axis $N_1$, the second nozzle 414 defines a central longitudinal second nozzle axis $N_2$, and the first trough 418 defines a central longitudinal first trough axis Ti. The first nozzle axis $N_1$ forms a first angle $\theta_1$ with respect to the first trough axis Ti and the second nozzle axis $N_2$ forms a second angle $\theta_2$ with respect to the first trough axis Ti. In some such embodiments, the first angle $\theta_1$ and the second angle $\theta_2$ are substantially the same. In certain other embodiments, the first angle $\theta_1$ and the second angle $\theta_2$ differ. These configurations may be used in combination with one or more arrangements of radial distance of the nozzles to permit differing coolant dispersal angles to permit tunability of coolant delivery.

Figure 27:
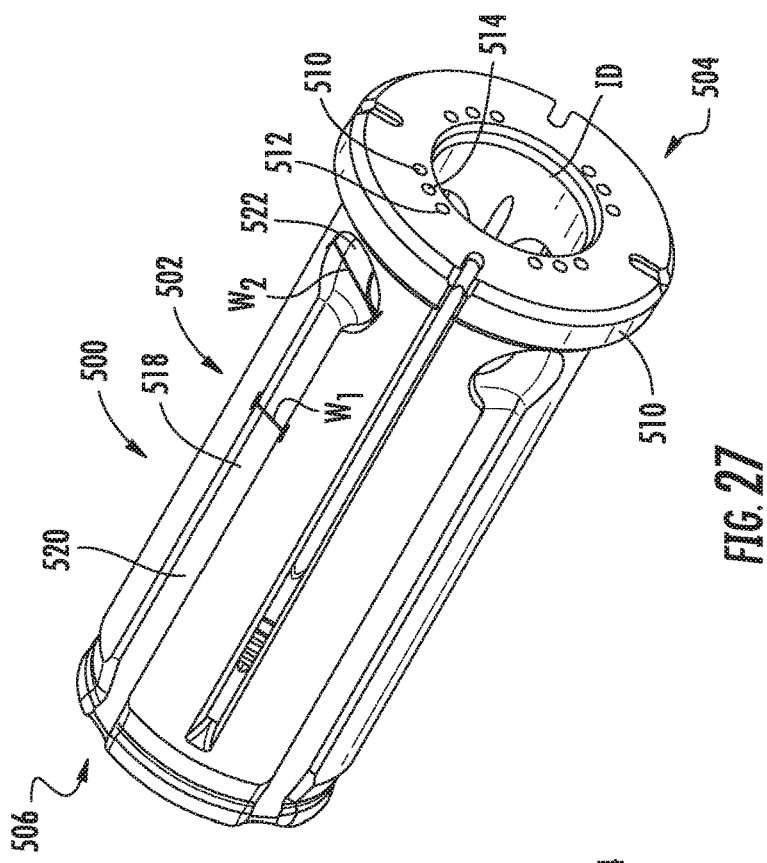
FIG. 27 is another isometric view of the specific embodiment of the reducer sleeve of FIG. 26.
Figure 26:
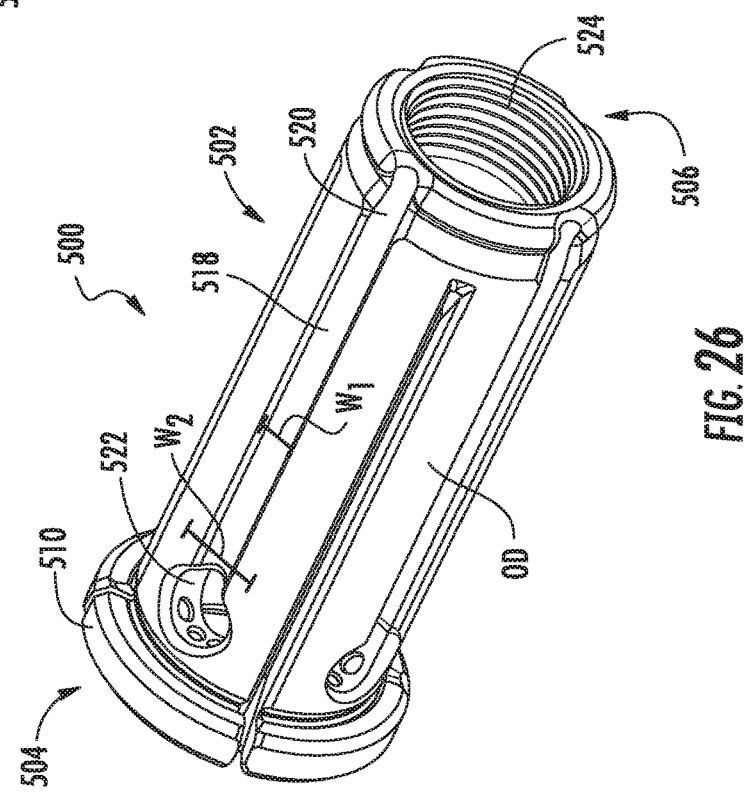
FIG. 26 is an isometric view of another specific embodiment of a reducer sleeve.

FIGS. 26 through 27 illustrate another specific embodiment of a reducer sleeve described herein, generally designated as 500. The reducer sleeve 500 comprises a reducer sleeve body 502 having an axial forward end 504 and an axial rearward end 506 and defines a longitudinal axis 508. A flange 510 is disposed at the axial forward end 504 of the reducer sleeve body 502. The flange 510 defines a first nozzle 512 disposed at a first radial distance $r_1$ from the longitudinal axis 508 and a second nozzle 514 disposed at a second radial distance (not shown) from the longitudinal axis 508. The reducer sleeve body 502 defines a first trough 518 extending from the axial rearward end 506 to the axial forward end 504. The first trough 518 is in communication with the first nozzle 512 and the second nozzle 514 whereby coolant is able to enter the first trough 518 and flow along the first trough 518 and into the first nozzle 512 and the second nozzle 514 such that coolant is ejected by the first nozzle 512 and the second nozzle 514.

Figure 28:
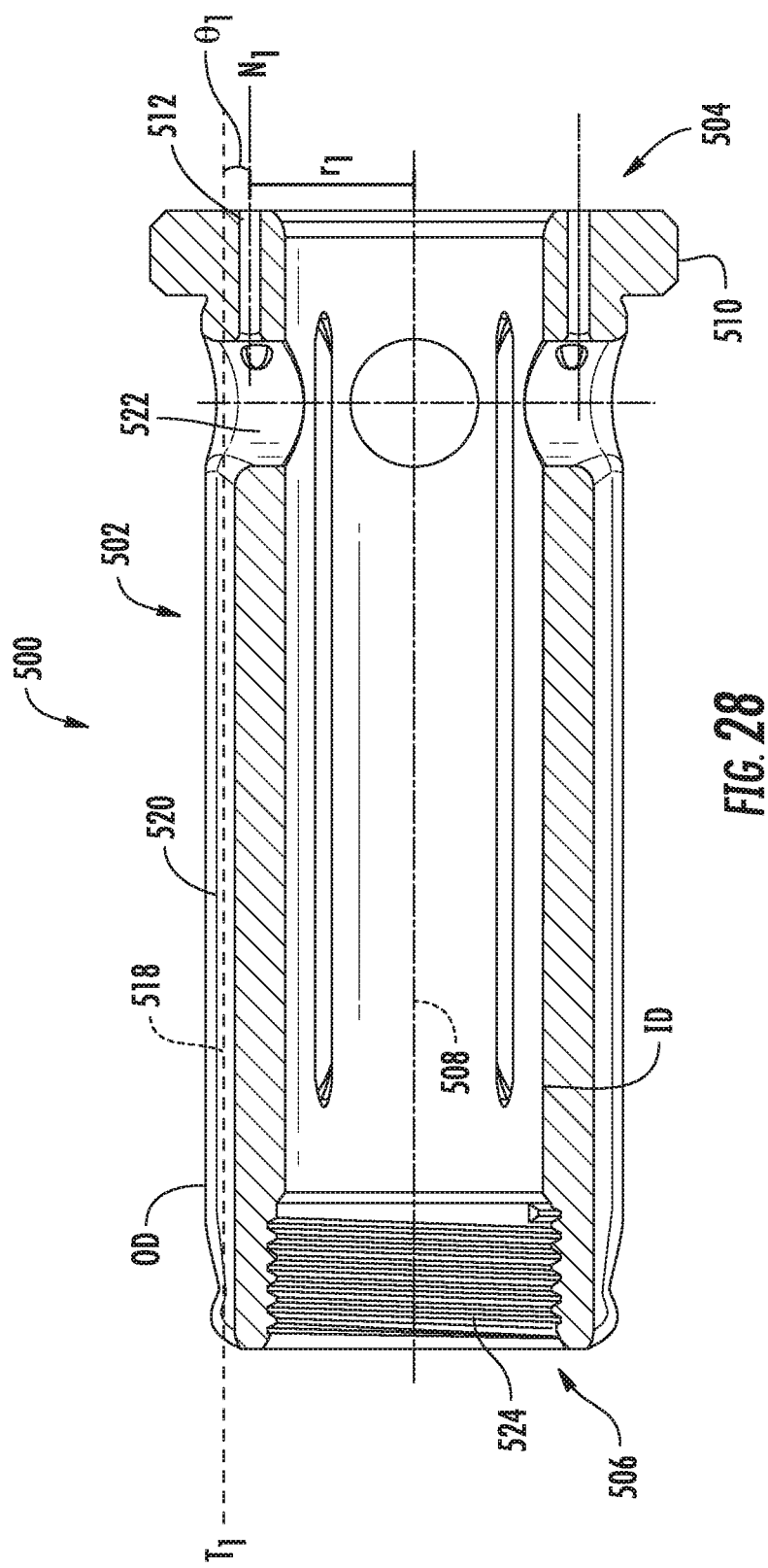
FIG. 28 is a cross-sectional view of the reducer sleeve of FIG. 26 taken along a plane containing the longitudinal axis.

It is to be understood that the embodiment illustrated in FIGS. 26 through 28 may be modified or altered consistent with the above discussion of other embodiments such as, in particular, FIGS. 23 through 25.

Figure 30:
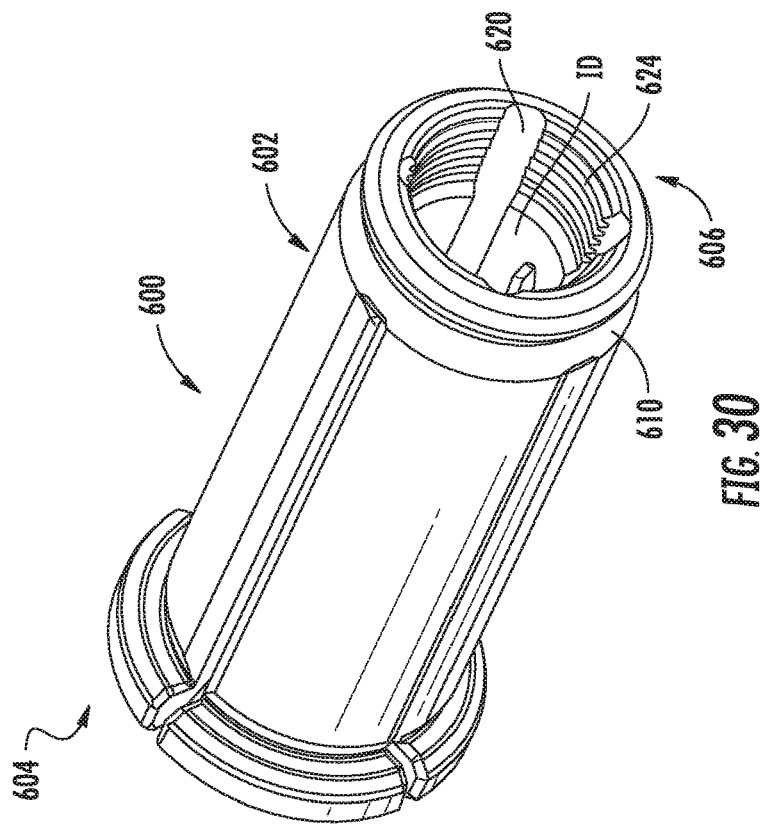
FIG. 30 is another isometric view of the specific embodiment of the reducer sleeve of FIG. 29.
Figure 29:
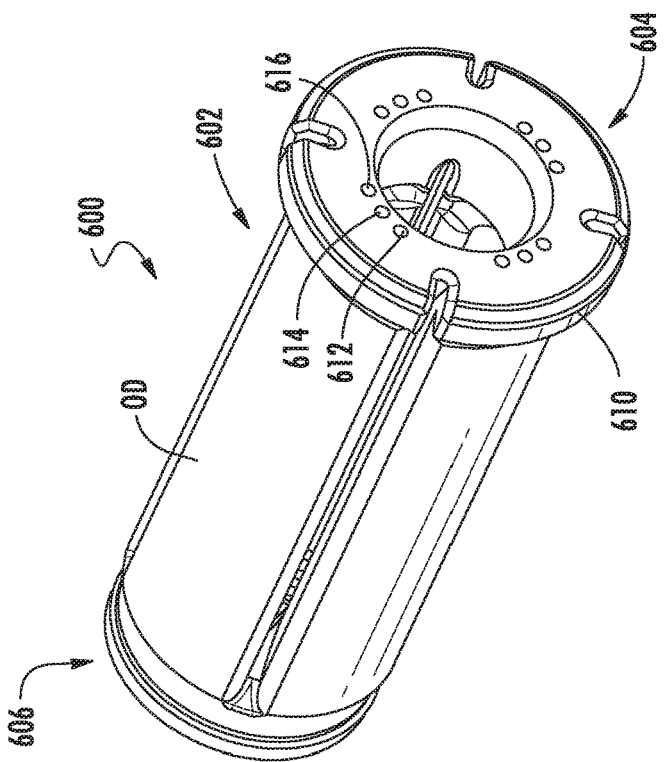
FIG. 29 is an isometric view of another specific embodiment of a reducer sleeve.
Figure 31:
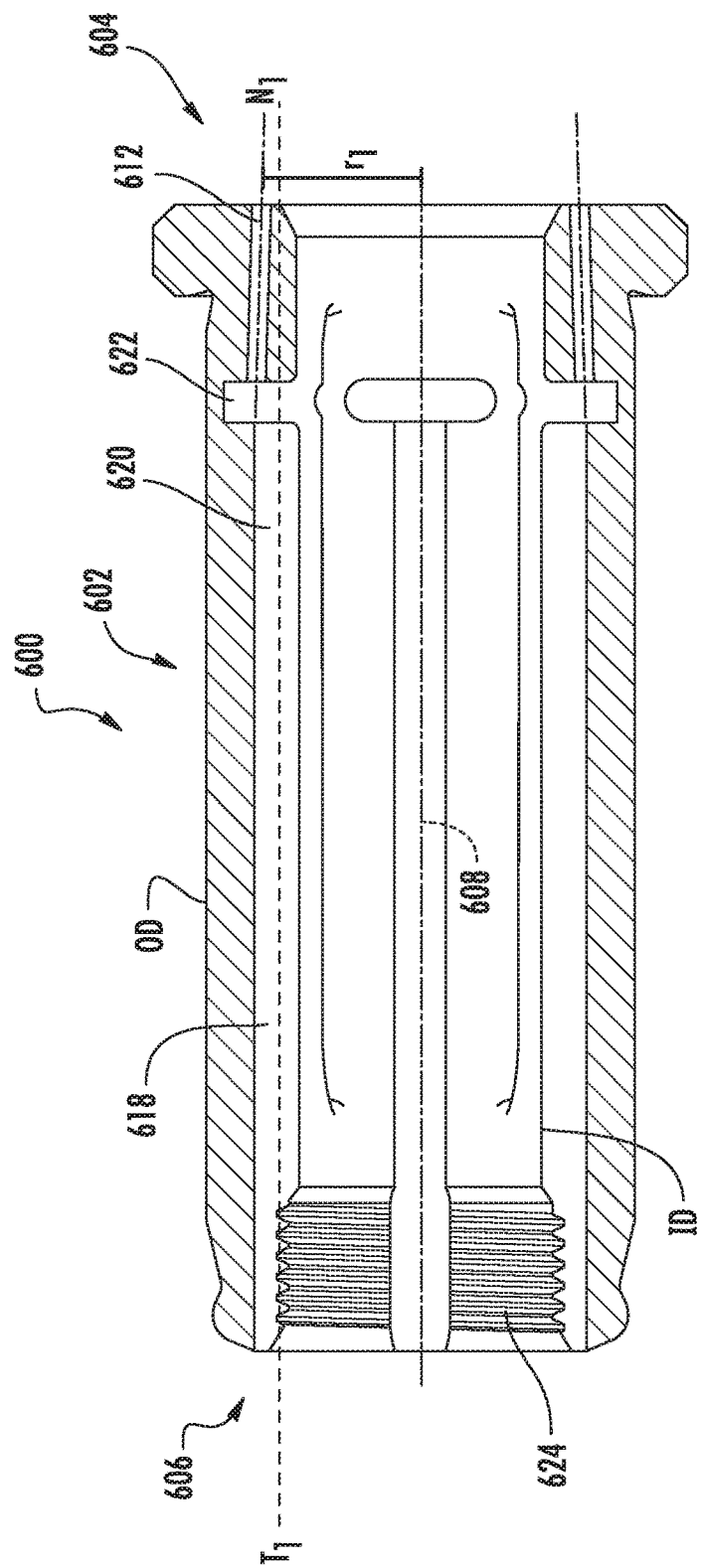
FIG. 31 is a cross-sectional view of the reducer sleeve of FIG. 29 taken along a plane containing the longitudinal axis.

FIGS. 29 through 31 illustrate another specific embodiment of a reducer sleeve described herein, generally designated as 600. The reducer sleeve 600 comprises a reducer sleeve body 602 having an axial forward end 604 and an axial rearward end 606 and defines a longitudinal axis 608. A flange 610 is disposed at the axial forward end 604 of the reducer sleeve body 602. The flange 610 defines a first nozzle 612 disposed at a first radial distance $r_1$ from the longitudinal axis 608 and a second nozzle 614 disposed at a second radial distance (not shown) from the longitudinal axis 608. The reducer sleeve body 602 defines a first trough 618 extending from the axial rearward end 606 to the axial forward end 604. The first trough 618 is in communication with the first nozzle 612 and the second nozzle 614 whereby coolant is able to enter the first trough 618 and flow along the first trough 618 and into the first nozzle 612 and the second nozzle 614 such that coolant is ejected by the first nozzle 612 and the second nozzle 614.

In the embodiment of FIGS. 29 through 31, the first trough 618 defines a longitudinal portion 620 extending generally parallel to the longitudinal axis 608 and forming a recess along an inner diameter ID of the reducer sleeve body 602. The radial portion 622 extends generally orthogonal to the longitudinal axis 608 and extends from the inner diameter ID of the reducer sleeve body 602 to a radial distance greater than or equal to each of the first radial distance $r_1$ and the second radial distance $r_2$. The radial portion 622 is not in communication with the outer diameter OD of the reducer sleeve body, forming an entirely internal first trough 618. The radial portion 622 of the first trough 618 is adjacent to and in communication with the first nozzle 612 and the second nozzle 614.

Figure 34:
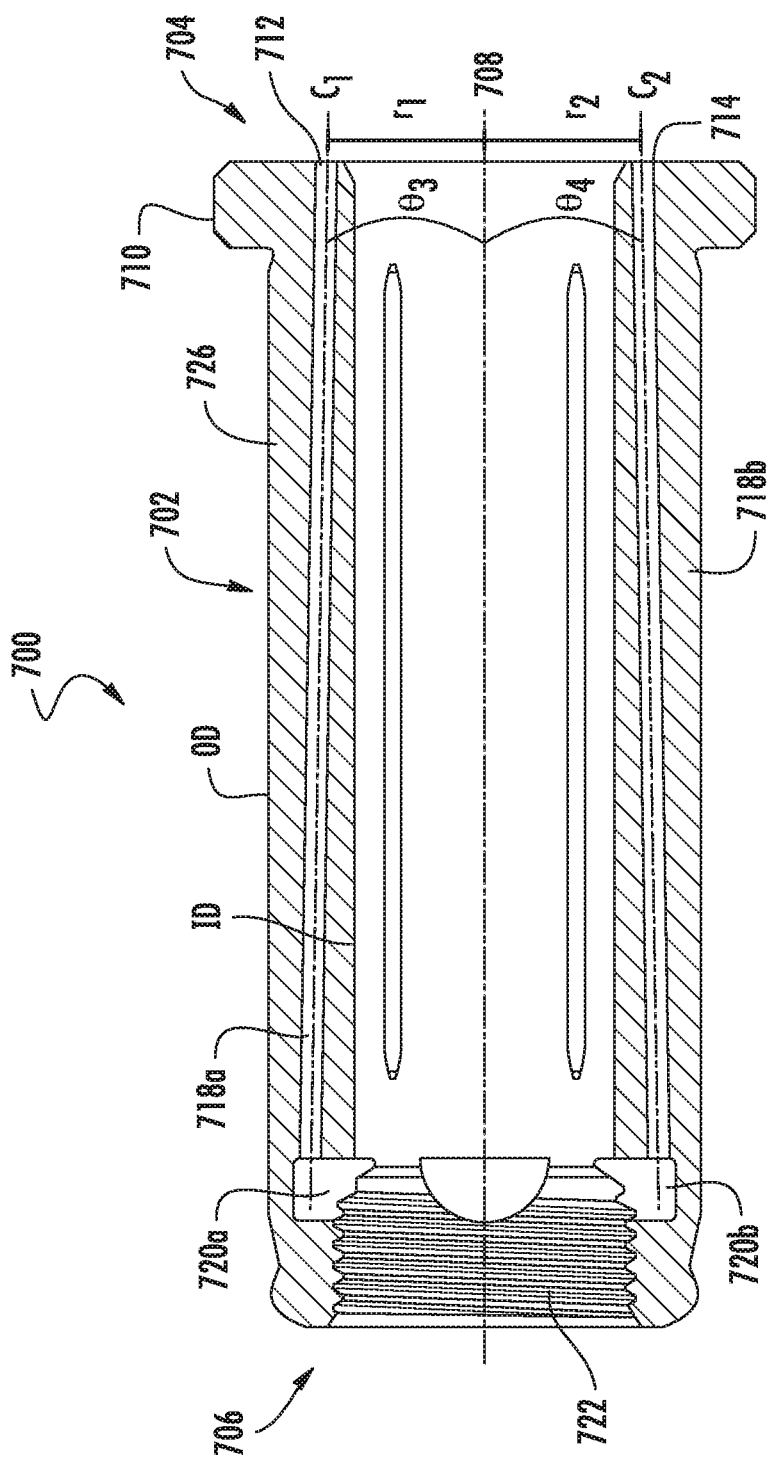
FIG. 34 is a cross-sectional view of the reducer sleeve of FIG. 32 taken along a plane containing the longitudinal axis.

FIGS. 32 through 34 illustrate another specific embodiment of a reducer sleeve described herein, generally designated as 700. The reducer sleeve body 702 defines a longitudinal axis 708 and has an axial forward end 706, an axial rearward end 708, and an outer sidewall 726 defining an outer diameter OD and an interior recess with an inner diameter ID. The reducer sleeve 700 further comprises a flange 710 disposed at the axial forward end 704 of the reducer sleeve body 702. The flange 710 defines a first nozzle 712 disposed at a first radial distance $r_1$. The outer sidewall 726 contains a longitudinally extending first internal coolant flow channel 718 in communication with the first nozzle 714. The first nozzle 714 is directed towards the longitudinal axis 708 of the reducer sleeve body 702. In the embodiment of FIGS. 32 through 34, the first internal coolant flow channel 718 terminates at the axial rearward end 706 in a radially extending coolant supply port 720 in communication with the inner diameter ID of the reducer sleeve body 702. The first internal coolant flow channel 718a terminates at the axial forward end 704 in the first nozzle 712. In addition, in some embodiments, as in FIGS. 32 through 34, the reducer sleeve body 702 has an internally threaded fastener portion 722 at the axial rearward end 706 and the radially extending coolant supply port 720 terminates in the internally threaded fastener portion 722. The first coolant flow channel 718a and the first nozzle 712 together define a longitudinal first coolant supply axis $C_1$. The first coolant supply axis $C_1$ can be disposed at a non-zero first ejection angle $\theta_3$ relative to the longitudinal axis 708 of the reducer sleeve body 702.

In some embodiments, the flange 710 further defines a second nozzle 714 disposed a second radial distance $r_2$ from the longitudinal axis 708, and the outer sidewall 726 contains a longitudinally extending second internal coolant flow channel 718b in communication with the second nozzle 714. The first radial distance $r_1$ is, in some embodiments, greater than the second radial distance $r_2$. In certain other embodiments, the first radial distance $r_1$ is substantially the same as the second radial distance $r_2$. The second coolant flow channel 718b and the second nozzle 714 together define a longitudinal second coolant supply axis $C_2$ disposed at a non-zero second ejection angle $\theta_4$. In some embodiments, the first ejection angle $\theta_3$ differs from the second ejection angle $\theta_4$. In certain other embodiments, the first ejection angle $\theta_3$ is substantially the same as the second ejection angle.

Figure 37:
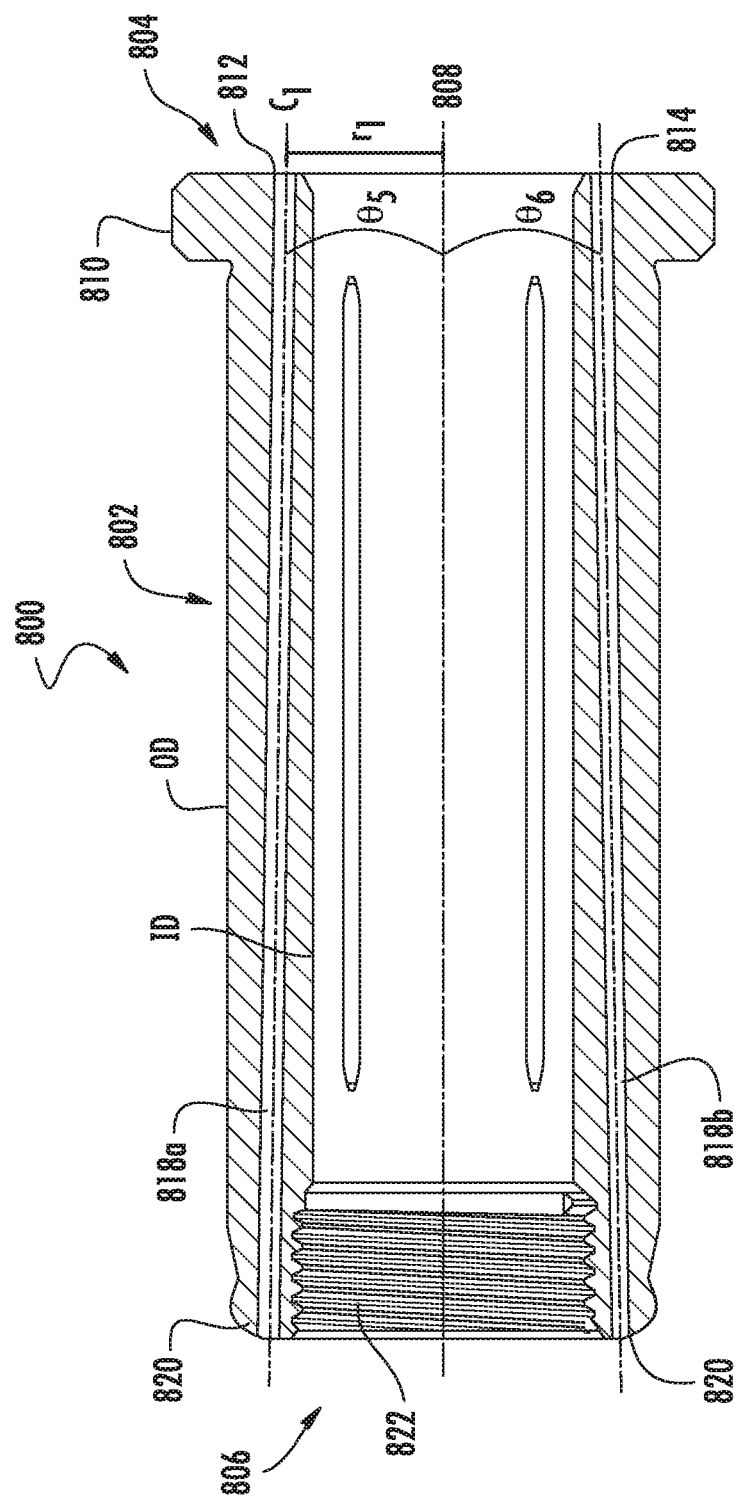
FIG. 37 is a cross-sectional view of the reducer sleeve of FIG. 35 taken along a plane containing the longitudinal axis.

FIGS. 35 through 37 illustrate another specific embodiment of a reducer sleeve described herein, generally designated as 800. The reducer sleeve body 802 defines a longitudinal axis 808 and has an axial forward end 806, an axial rearward end 808, and an outer sidewall 826 defining an outer diameter OD and an interior recess with an inner diameter ID. The reducer sleeve 800 further comprises a flange 810 disposed at the axial forward end 804 of the reducer sleeve body 802. The flange 810 defines a first nozzle 812 disposed at a first radial distance $r_1$. The outer sidewall 826 contains a longitudinally extending first internal coolant flow channel 818 in communication with the first nozzle 814. The first nozzle 814 is directed towards the longitudinal axis 808 of the reducer sleeve body 802. It is to be understood that the embodiment illustrated in FIGS. 35 and 37 may be modified in any manner not inconsistent with the present invention such as, for example, consistent with the above discussion of the embodiment of FIGS. 32 through 34. In the embodiment of FIGS. 35 through 37, the first internal coolant flow channel 818a terminates at the axial rearward end 806 in an orifice 820 at a rearward face of the reducer sleeve body 802.

It is apparent that various reference numerals have been provided in the figures which are not expressly discussed herein above. It is to be understood that a feature previously illustrated in one or more specific embodiments, where structurally substantially the same, correlate in nomenclature and function to an associated reference numeral in such previously discussed figure. In particular, nomenclature associated with a particular reference numeral provided in FIGS. 26 through 31 correspond to a feature which is substantially the same as one discussed in the context of FIGS. 23 through 25. Similarly, nomenclature associated with a particular reference numeral provided in FIGS. 35 through 37 corresponds to nomenclature for a feature of FIGS. 32 through 34 with substantially the same structure.

It is also apparent that the present invention provides a reducer sleeve that provides for its own coolant delivery to the cutting tool of the cutting assembly of which it is a part. Further, it is apparent that the present invention provides a cutting assembly that uses a reducer sleeve, which provides for its own coolant delivery to the cutting tool.

It is apparent that the present invention provides a reducer sleeve that provides for its own coolant delivery along the entire length of the cutting section of the cutting tool of the cutting assembly of which it is a part. Further, it is apparent that the present invention provides a cutting assembly that uses a reducer sleeve, which provides for its own coolant delivery along the entire length of the cutting section of the cutting tool.

It is apparent that the present invention provides a reducer sleeve that provides for its own coolant delivery under adequate pressure to the cutting tool of the cutting assembly of which it is a part. Further, it is apparent that the present invention provides a cutting assembly that uses a reducer sleeve, which provides for its own coolant delivery under adequate pressure to the cutting tool.

The patents and other documents identified herein are hereby incorporated in their entirety by reference herein. Other embodiments of the invention will be apparent to those skilled in the art from a consideration of the specification or a practice of the invention disclosed herein. There is the intention that the specification and examples are illustrative only and are not intended to be limiting on the scope of the invention. The following claims indicate the true scope and spirit of the invention.

The invention claimed is:

1. A reducer sleeve comprising:
   a reducer sleeve body having an axial forward end and an axial rearward end and defining a longitudinal axis; and
   a flange disposed at the axial forward end of the reducer sleeve body, the flange defining:
      a first nozzle disposed at a first radial distance from the longitudinal axis;
      a second nozzle disposed at a second radial distance from the longitudinal axis;
      a third nozzle disposed at a third radial distance from the longitudinal axis; and
      a fourth nozzle disposed at a fourth radial distance from the longitudinal axis;
   wherein the reducer sleeve body defines:
      a first trough extending from the axial rearward end to the axial forward end, the first trough being in communication with the first nozzle and the second nozzle whereby coolant is able to enter the first trough and flow along the first trough and into the first nozzle and the second nozzle such that coolant is ejected by the first nozzle and the second nozzle; and
      a second trough extending from the axial rearward end to the axial forward end, the second trough being in communication with the third nozzle and the fourth nozzle whereby coolant is able to enter the second trough and flow along the second trough and into the third nozzle and the fourth nozzle such that coolant is ejected by the third nozzle and the fourth nozzle; and wherein the first trough terminates at a rearward facing surface at the axial rearward end of the reducer sleeve body.

2. The reducer sleeve of claim 1, wherein the first distance is greater than the second distance.

3. The reducer sleeve of claim 1, wherein the first distance is substantially the same as the second distance.

4. The reducer sleeve of claim 1, wherein:
the first trough defines a longitudinal portion and a radial portion, the longitudinal portion extending generally parallel to the longitudinal axis and forming a recess along an outer diameter of the reducer sleeve body, and the radial portion extending generally orthogonal to the longitudinal axis and extending from the outer diameter of the reducer sleeve body to an inner diameter of the reducer sleeve body; and
the radial portion of the first trough is adjacent to and in communication with the first nozzle and the second nozzle.

5. The reducer sleeve of claim 4, wherein:
the longitudinal portion of the first trough defines a first width measured along the outer diameter of the reducer sleeve body;
the radial portion of the first trough defines a second width measured along the outer diameter of the reducer sleeve body; and
the second width is greater than the first width.

6. The reducer sleeve of claim 4, wherein the radial portion of the first trough defines an oblong or substantially circular cross-sectional shape when viewed from the outer diameter of the reducer sleeve body.

7. The reducer sleeve of claim 4, wherein at least one of the first nozzle and the second nozzle is directed towards the longitudinal axis of the reducer sleeve.

8. The reducer sleeve of claim 1, wherein:
the first nozzle defines a central longitudinal first nozzle axis;
the second nozzle defines a central longitudinal second nozzle axis;
the first trough defines a central longitudinal first trough axis;
the first nozzle axis forms a first angle with respect to the first trough axis and the second nozzle axis forms a second angle with respect to the first trough axis; and
the first angle and the second angle are substantially the same.

9. The reducer sleeve of claim 1, wherein:
the first nozzle defines a central longitudinal first nozzle axis;
the second nozzle defines a central longitudinal second nozzle axis;
the first trough defines a central longitudinal first trough axis;
the first nozzle axis forms a first angle with respect to the first trough axis and the second nozzle axis forms a second angle with respect to the first trough axis; and
the first angle and the second angle differ.

10. A reducer sleeve comprising:
a reducer sleeve body defining a longitudinal axis and having an axial forward end, an axial rearward end, and an outer sidewall defining an outer diameter and an interior recess with an inner diameter;
a flange disposed at the axial forward end of the reducer sleeve body, the flange defining a first nozzle disposed at a first radial distance from the longitudinal axis,
wherein the outer sidewall contains a longitudinally extending first internal coolant flow channel in coaxial with and communication with the first nozzle;
wherein the first nozzle is directed towards the longitudinal axis of the reducer sleeve body; and
wherein the first internal coolant flow channel terminates at a rearward facing surface at the axial rearward end of the reducer sleeve body.

11. The reducer sleeve of claim 10, wherein:
the first internal coolant flow channel terminates at the axial rearward end in an orifice at the rearward facing surface of the reducer sleeve body; and
the first internal coolant flow channel terminates at the axial forward end in the first nozzle.

12. The reducer sleeve of claim 10, wherein:
the first internal coolant flow channel terminates at the axial rearward end in a radially extending coolant supply port in communication with the inner diameter of the reducer sleeve body; and
the first internal coolant flow channel terminates at the axial forward end in the first nozzle.

13. The reducer sleeve of claim 12, wherein:
the reducer sleeve body has an internally threaded fastener portion at the axial rearward end; and
the radially extending coolant supply port terminates in the internally threaded fastener portion.

14. The reducer sleeve of claim 10, wherein the first coolant flow channel and the first nozzle together define a longitudinal first coolant supply axis, the first coolant supply axis being disposed at a non-zero angle relative to the longitudinal axis of the reducer sleeve body.

15. The reducer sleeve of claim 10, wherein
the flange further defines a second nozzle disposed at a second radial distance from the longitudinal axis; and
the outer sidewall contains a longitudinally extending second internal coolant flow channel in communication with the second nozzle.

16. The reducer sleeve of claim 15, wherein the first radial distance is greater than the second radial distance.

17. The reducer sleeve of claim 15, wherein the first radial distance is substantially the same as the second radial distance.

18. The reducer sleeve of claim 15, wherein:
the first coolant flow channel and the first nozzle together define a longitudinal first coolant supply axis, the first coolant supply axis being disposed at a non-zero first ejection angle relative to the longitudinal axis of the reducer sleeve body;
the second coolant flow channel and the second nozzle together define a longitudinal second coolant supply axis, the second coolant supply axis being disposed at a non-zero second ejection angle relative to the longitudinal axis of the reducer sleeve; and
wherein the first ejection angle differs from the second ejection angle.

19. The reducer sleeve of claim 15, wherein:
the first coolant supply port and the first nozzle together define a longitudinal first coolant supply axis, the first coolant supply axis being disposed at a non-zero first ejection angle relative to the longitudinal axis of the reducer sleeve body;
the second coolant supply port and the second nozzle together define a longitudinal second coolant supply axis, the second coolant supply axis being disposed at a non-zero second ejection angle relative to the longitudinal axis of the reducer sleeve; and wherein the first ejection angle is substantially the same as the second ejection angle.

20. A reducer sleeve comprising:

a reducer sleeve body having an axial forward end and an axial rearward end and defining a longitudinal axis; and a flange disposed at the axial forward end of the reducer sleeve body, the flange defining a first nozzle disposed at a first radial distance from the longitudinal axis and a second nozzle disposed at a second radial distance from the longitudinal axis, wherein the reducer sleeve body defines a first trough extending from the axial rearward end to the axial forward end, the first trough being in communication with the first nozzle and the second nozzle whereby coolant is able to enter the first trough and flow along the first trough and into the first nozzle and the second nozzle such that coolant is ejected by the first nozzle and the second nozzle, wherein the first trough terminates at a rearward facing surface at the axial rearward end of the reducer sleeve body;

wherein the first trough defines a longitudinal portion and a radial portion, the longitudinal portion extending generally parallel to the longitudinal axis and forming a recess along an inner diameter of the reducer sleeve body, and the radial portion extending generally orthogonal to the longitudinal axis and extending from the inner diameter of the reducer sleeve body to a radial distance greater than or equal to each of the first radial distance and the second radial distance;

wherein the radial portion is not in communication with the outer diameter of the reducer sleeve body; and wherein the radial portion of the first trough is adjacent to and in communication with the first nozzle and the second nozzle.

* * * * *